US012623868B2

(12) United States Patent
Henning et al.

(10) Patent No.: US 12,623,868 B2
(45) **Date of Patent: *May 12, 2026**

(54) CURTAIN ASSEMBLIES OR SEALS FOR DOCK LEVELERS

(71) Applicant: Rite-Hite Holding Corporation, Milwaukee, WI (US)

(72) Inventors: Bruce Henning, Dubuque, IA (US); Collin Thole, Lancaster, WI (US); Frank Heim, Platteville, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/637,152

(22) Filed: Apr. 16, 2024

(65) Prior Publication Data

US 2025/0083911 A1     Mar. 13, 2025

Related U.S. Application Data

(63) Continuation of application No. 17/156,171, filed on Jan. 22, 2021, now Pat. No. 11,987,458.

(60) Provisional application No. 62/964,452, filed on Jan. 22, 2020.

(51) Int. Cl.
    *B65G 69/28*          (2006.01)
(52) U.S. Cl.
    CPC ................................ *B65G 69/2876* (2013.01)
(58) Field of Classification Search
    CPC .......................... B65G 69/2876; B65G 69/008
    See application file for complete search history.

(56) References Cited

U.S. PATENT DOCUMENTS

| | | | |
|---|---|---|---|
| 4,110,860 | A | 9/1978 | Neff |
| 4,422,199 | A | 12/1983 | Frommelt |
| 4,557,008 | A | 12/1985 | Jurden |
| 6,502,268 | B2 | 1/2003 | Ashelin |
| 7,146,673 | B1 | 12/2006 | Digmann |

(Continued)

FOREIGN PATENT DOCUMENTS

| | | |
|---|---|---|
| CN | 101304935 A | 11/2008 |
| CN | 103025634 A | 4/2013 |
| CN | 105151838 A | 12/2015 |

OTHER PUBLICATIONS

International Searching Authority, "Written Opinion," issued in connection with International Application No. PCT/US2021/014690, filed on Jan. 22, 2021, 9 pages.

(Continued)

*Primary Examiner* — Abigail A Risic
(74) *Attorney, Agent, or Firm* — Hanley, Flight & Zimmerman, LLC

(57)          ABSTRACT

Example dock leveler apparatuses are disclosed. A dock leveler apparatus includes a curtain assembly that includes an upper curtain section and a lower curtain section. The curtain assembly is movable between a folded configuration and a pendant configuration. The curtain assembly having a longer length in the pendant configuration than in the folded configuration. A connector couples to the upper curtain section to a deck pivotally coupled to a base frame of a dock leveler. A releasable coupling between the upper curtain section and the lower curtain section. The releasable coupling is to removably couple the lower curtain section and the upper curtain section.

20 Claims, 17 Drawing Sheets

(56) References Cited

U.S. PATENT DOCUMENTS

| | | | |
|---|---|---|---|
| 7,594,290 | B2 | 9/2009 | Eungard |
| 7,877,831 | B2 | 2/2011 | Digmann |
| 8,800,086 | B1 | 8/2014 | Borgerding |
| 9,170,044 | B2 | 10/2015 | Hoffmann |
| 2002/0152562 | A1 | 10/2002 | Ashelin et al. |
| 2007/0101517 | A1 | 5/2007 | Digmann |
| 2007/0215297 | A1* | 9/2007 | Lin .......................... A47H 1/04 |
| | | | 160/332 |
| 2008/0052843 | A1 | 3/2008 | Eungard |
| 2009/0126130 | A1 | 5/2009 | Bettendorf |
| 2010/0264596 | A1 | 10/2010 | Whitley et al. |
| 2010/0269427 | A1 | 10/2010 | Digmann |
| 2010/0270818 | A1* | 10/2010 | Mills .................. B60H 1/00357 |
| | | | 454/70 |
| 2015/0059105 | A1 | 3/2015 | Borgerding |

OTHER PUBLICATIONS

International Searching Authority, "International Search Report," issued in connection with PCT No. PCT/US2021/014690, Jun. 30, 2021, 5 pages.

International Searching Authority, "International Preliminary Report on Patentability," issued in connection with International Application No. PCT/US2021/014690, issued on Jul. 26, 2022, 37 pages.

Mexican Patent Office, "First Form Examination requirement and priority claim report," issued in connection with MX/a/2022/009107, mailed on Aug. 3, 2022, 6 pages. [Machine English Translation provided].

International Searching Authority, "International Preliminary Report on Patentability," issued in connection with International Patent Application No. PCT/US2021/014690, issued on Aug. 4, 2022, 11 pages.

Mexican Patent Office, "Examination Report" issued in connection with MX/a/2022/009107, mailed on Oct. 10, 2022, 4 pages. [Machine English Translation provided].

United States Patent and Trademark Office, "Requirement for Restriction / Election," issued in connection with U.S. Appl. No. 17/156,171, dated Mar. 16, 2023, 9 pages.

United States Patent and Trademark Office, "Non-Final Office Action" issued in connection with U.S. Appl. No. 17/156,171 mailed on Aug. 17, 2023, 7 pages.

Australian Government, IP Australia," Patent Examination Report No. 1," issued in connection with AU Application No. 2021210966, issued on Aug. 23, 2023, 3 pages.

China National Intellectual Property Administration, "First Office Action," issued in connection with Chinese Patent Application No. 202180017741.9, dated Aug. 26, 2023, 20 pages.

Canadian Intellectual Property Office, "Examiner's Report," issued in connection with Canadian Patent Application No. 3,165,775, dated Oct. 17, 2023, 10 Pages.

United States Patent and Trademark Office, "Notice of Allowance and Fee(s) Due," issued in connection with U.S. Appl. No. 17/156,171, dated Jan. 16, 2024, 5 pages.

United States Patent and Trademark Office, "Corrected Notice of Allowability," issued in connection with U.S. Appl. No. 17/156,171, dated Feb. 7, 2024, 2 pages.

The State Intellectual Property Office of People's Republic of China, "The Second Office Action," issued in connection with Chinese Patent Application No. 202180017741.9, dated Apr. 18, 2024, 10 pages. (including English translation).

Australian Government, IP Australia, "Examination Report No. 2," issued in connection with Australian Application No. 2021210966, dated Jul. 29, 2024, 3 pages.

Australian Government, IP Australia, "Notice of acceptance for patent application," issued in connection with Australian Patent Application No. 2021210966, dated Aug. 19, 2024, 3 pages.

European Patent Office, "Communication pursuant to Article 94(3) EPC," issued in connection with European Patent Application No. 21705814.8, Sep. 13, 2024, 5 pages.

The State Intellectual Property Office of the People's Republic of China, "Third Office Action and Supplementary Search," issued in connection with Application No. 202180017741.9, dated Sep. 30, 2024, 9 pages [English translation included].

Canadian Intellectual Property Office, "Examiner requisition," issued in connection with Canadian Patent Application No. 3,165,775, dated Nov. 13, 2024, 6 pages.

Australian Government, Ip Australia, "Notice of grant for patent," issued in connection with AU Application No. 2021210966, issued on Dec. 12, 2024, 1 page.

The State Intellectual Property Office of People's Republic of China, "Notification to Grant Patent Right for Invention," issued in connection with Chinese Patent Application No. 202180017741.9, dated Dec. 15, 2024, 3 pages. [English Translation Included].

Blue Giant, Aftermarket Solutions, figures, published in 2016.

Canadian Intellectual Property Office, "Examiner's Requisition," issued in connection with Canadian Patent Application No. 3,165,775, dated Nov. 6, 2025, 5 pages.

Australian Government, IP Australia, "Examination report No. 1," issued in connection with Australian Patent Application No. 2024266986, Nov. 28, 2025, 5 pages.

* cited by examiner

18

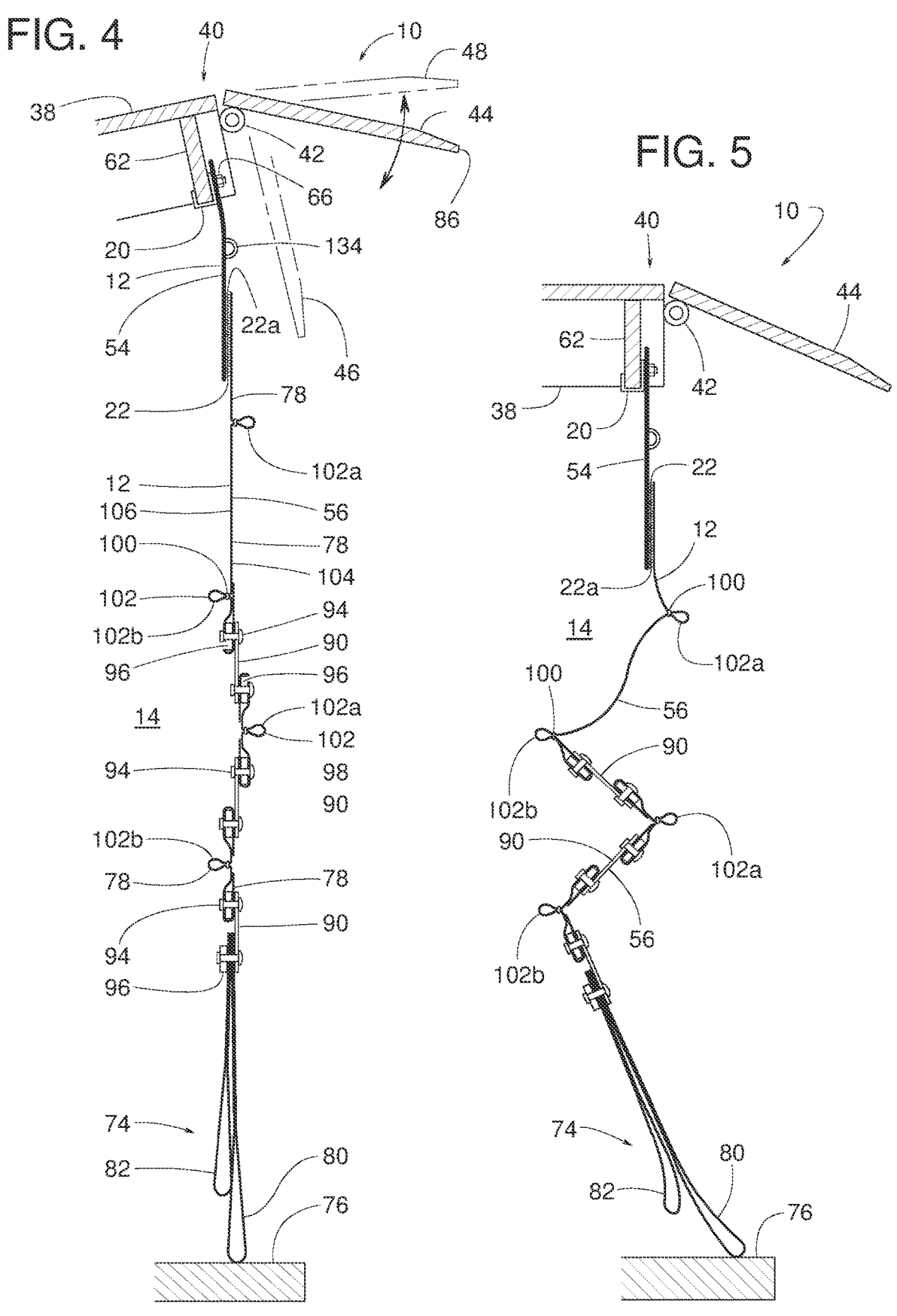

18

CURTAIN ASSEMBLIES OR SEALS FOR DOCK LEVELERS

CROSS-REFERENCE TO RELATED APPLICATIONS

This patent arises from a continuation of U.S. Nonprovisional patent application Ser. No. 17/156,171, filed on Jan. 22, 2021, which claims the benefit of U.S. Provisional Patent Application Ser. No. 62/964,452, filed on Jan. 22, 2020, each of which is hereby incorporated herein by reference in its entirety. Priority is hereby claimed to U.S. Nonprovisional patent application Ser. No. 17/156,171 and U.S. Provisional Patent Application Ser. No. 62/964,452.

FIELD OF THE DISCLOSURE

This disclosure relates generally to dock levelers used at loading docks and, more particularly, to curtain assemblies or seals for dock levelers.

BACKGROUND

A typical loading dock of a building includes an exterior doorway with an elevated platform for loading and unloading vehicles, such as trucks and trailers. Many loading docks have a dock leveler to compensate for a height difference that might exist between the loading dock platform and an adjacent cargo bed of a vehicle (e.g., a truck or trailer). Dock levelers usually have a deck or ramp that is pivotally hinged along a rear edge to vary the height of a front edge relative to the cargo bed of the vehicle. An extension plate or lip extends outward from the front edge of the deck to span the gap between the deck and the vehicle.

The deck and lip are usually moveable between a stored position and various operative positions. When in the stored position, the deck may be either vertical or horizontal, depending on the style of dock leveler. In various operative positions, the deck is generally at a slight angle from horizontal and the lip is extended or rotated from the front edge of the deck to rest upon the vehicle's cargo bed to form a bridge enabling personnel and material handling equipment to readily move on and off the vehicle during loading and unloading operations. Environmental enclosures (e.g., seals, shelters) are often installed around a perimeter of the dock doorway to reduce the exchange or flow of air, precipitation, contaminants, etc. between the interior and exterior environments when the dock door is open to load/unload a vehicle. Such enclosures are usually mounted along the upper and lateral edges of the doorway to reduce any gaps that might otherwise exist between the face of the building and the rear of the vehicle. The position of the dock leveler at the lower edge of the doorway and the operation of the leveler requiring the lip to extend beyond the dock face (i.e., into a vehicle) presents complications for sealing between the dock face and the vehicle along the lower edge of the doorway.

BRIEF DESCRIPTION OF THE DRAWINGS

FIG. 4 is an enlarged side view of the example curtain assembly shown in FIG. 1 with the example curtain assembly shown in an example pendant configuration.

FIG. 5 is a side view similar to FIG. 4 but showing the example curtain assembly in an example folded configuration.

DETAILED DESCRIPTION

Figure 1:
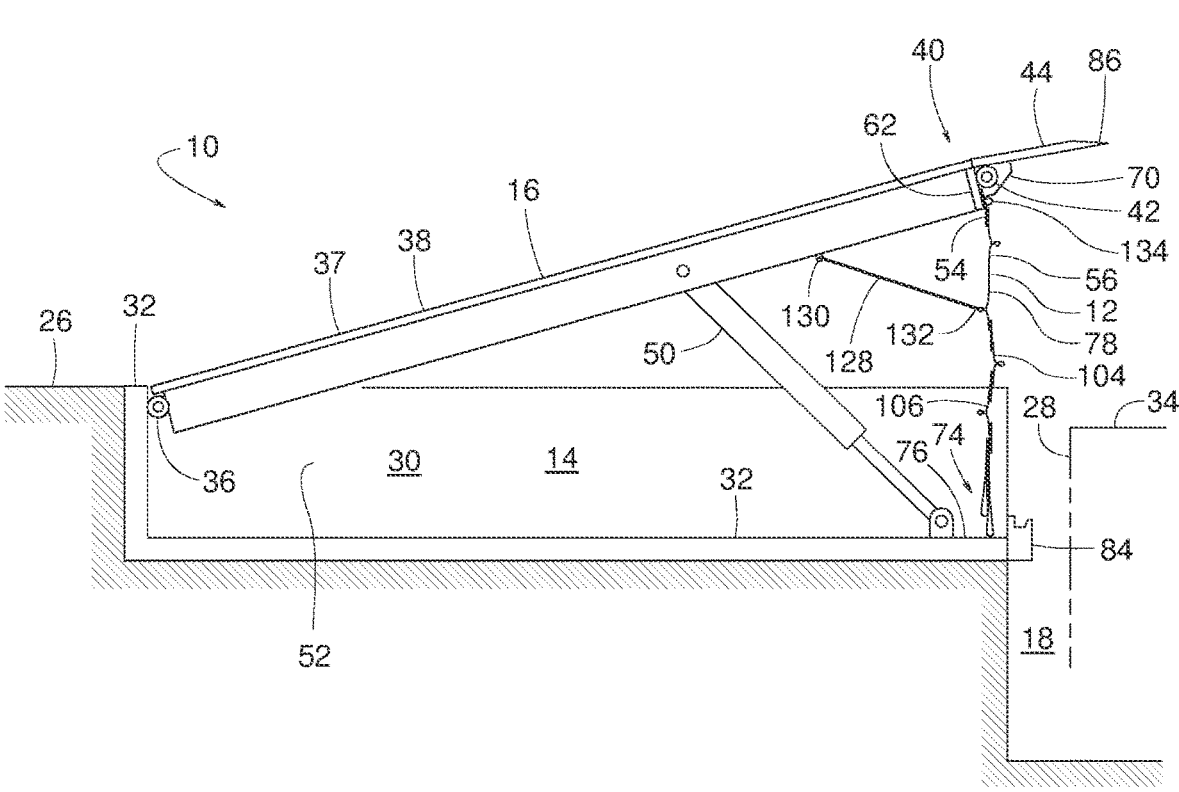
FIG. 1 is a side view of an example dock leveler apparatus including an example dock leveler and an example curtain assembly constructed in accordance with the teachings disclosed herein.

Example dock leveler apparatuses include example curtain assembly apparatus for sheltering an otherwise exposed area underneath a dock leveler of a vehicle loading dock. Some examples of the curtain assembly apparatus disclosed herein include universally positioned connectors and releasable connectors to facilitate installation of the curtain assembly apparatus with dock leveler. For example, one or more connectors can to an edge of a front plate of a deck of a dock leveler to couple the curtain assembly to the deck. The one or more connectors can be positioned at any location on the edge of the front plate between a first side lateral edge and a second side lateral edge opposite the first side lateral edge. For example, each of the connectors includes a first fastener (e.g., a clamp) to couple to the deck and a second fastener (e.g., a screw and nut, a hook, etc.) to couple to the curtain assembly. In some examples, the connector is a unitary structure having a length that is substantially equal to or less than a length between the first and second lateral side edges of the front plate of the deck.

Example curtain assembly apparatus disclosed herein include a first section (e.g., an upper curtain) and a second section (e.g., a lower curtain). The second section is removably coupled to the first section via a third fastener (e.g., a hook-and-loop fastener). Specifically, the third fastener enables the second section to be releasably coupled to the first section without use of a tool. The curtain assembly apparatus is composed of pliable material(s) to enable the curtain assembly apparatus to move between a folded configuration and an extended or unfolded configuration (e.g., as the deck of the dock leveler moves between a lowered position and a raised position). In some examples, the curtain assembly apparatus (e.g., the upper curtain and the lower curtain) are structured or configured to fold in a predetermined pattern when the curtain assembly apparatus moves to the folded configuration.

To enable the curtain assembly apparatus to fold in a predetermined pattern, the curtain assembly apparatus disclosed herein can include one or more fold lines, loops, hems, seams (e.g., sewn seams), fabric stiches, and/or any other structure(s) to enable the curtain assembly apparatus to fold in a predetermined pattern in response to a deck of a dock leveler moving toward a lower position (e.g., a stored or lowermost position). In some examples, the curtain assembly apparatus disclosed herein employ side seals that fill a gap or seal lateral edges of a curtain assembly and lateral side walls of a pit area.

FIGS. 1-24 show an example dock leveler apparatus 10 constructed in accordance with the teachings of this disclosure. The dock leveler apparatus 10 includes a curtain assembly 12 to shelter an area 14 (e.g., an otherwise exposed area) underneath a dock leveler 16 of a loading dock 18. The curtain assembly 12 of FIG. 1 includes connectors 20 (e.g., universally positionable connectors) and a releasable coupling 22 to facilitate assembly and/or installation of the curtain assembly 12 with different types (e.g., or various combinations) of dock levelers and/or loading docks including, for example, the dock leveler 16 and the loading dock 18.

In the illustrated example, the loading dock 18 includes an exterior doorway 24 with an elevated platform 26 for loading and unloading cargo of a vehicle 28 (e.g., trucks, trailers, etc.). The platform 26 extends partially around a pit 30 in which a base frame 32 of the dock leveler 16 is installed. In some examples, the base frame 32 is a single fabricated structure. In other examples, the base frame 32 includes multiple, spaced-apart pieces (e.g., that can be coupled together). Some example materials of the base frame 32 include metal and concrete.

To compensate for a height differential between the platform 26 and a cargo bed 34 of the vehicle 28, the dock leveler 16 includes a rear hinge 36 that pivotally connects a deck 38 to the base frame 32. The rear hinge 36 allows the deck 38 to pivotally adjust a front edge 40 to (e.g., more closely match) the height of the vehicle's cargo bed 34. FIGS. 1, 3, 4, and 13 show deck 38 in an example raised position, and FIGS. 2 and 5 show deck 38 in an example lowered position.

In some examples, a front hinge 42 pivotally connects a lip plate 44 to the front edge 40 of the deck 38. The front hinge 42 enables the lip plate 44 to pivot between a retracted stored position 46 (e.g., a fully retracted position) and an extended operative position 48 (e.g., a fully extended operative position) (both positions 46 and 48 shown in dash lines in FIG. 4).

Figure 2:
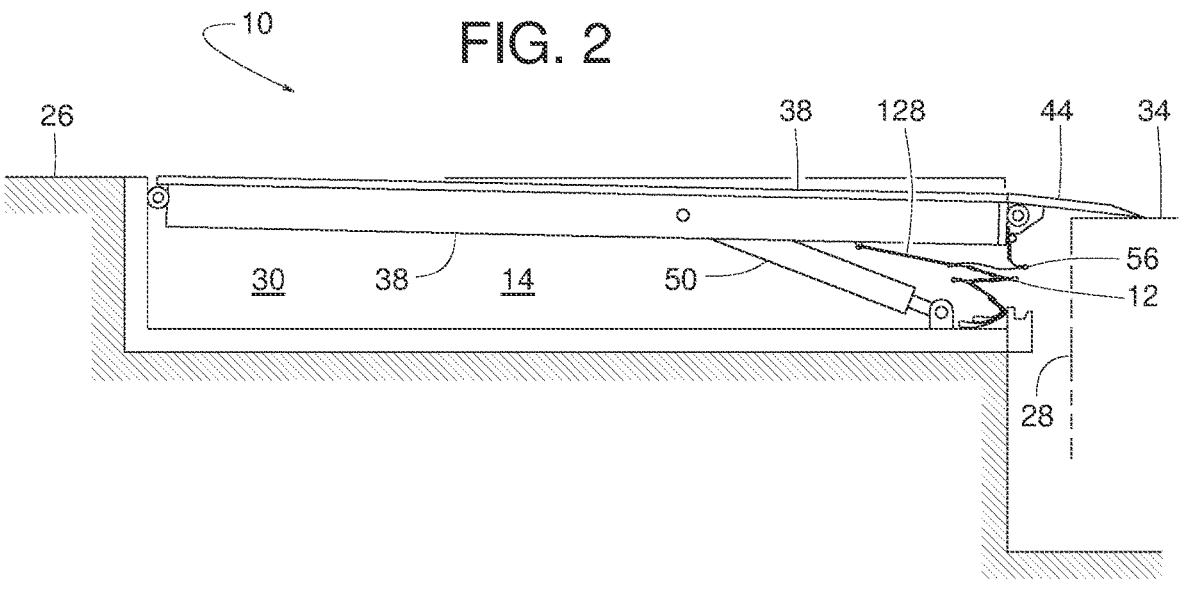
FIG. 2 is a side view similar to FIG. 1 but showing an example deck of the example dock leveler in an example lowered position.

When the lip plate 44 is in the extended operative position 48, an actuator 50 (e.g., hydraulic cylinder, motor, spring, bellows, various combinations thereof, etc.) adjusts or lowers the deck 38 to rest the lip plate 44 down upon the vehicle's cargo bed 34, as shown for example in FIG. 2. The deck 38 and the lip plate 44 provide a bridge between the platform 26 and the cargo bed 34, thereby allowing personnel and material handling equipment to transfer cargo to and from vehicle 28.

To inhibit hot or cold air from freely entering and/or leaving the area 14 underneath the deck 38, the curtain assembly 12 is installed in front or adjacent a front edge of the pit 30. More specially, the curtain assembly 12 extends (e.g., vertically) between the front end 40 of the deck 38 and the base frame 32 and extends laterally (e.g., sideways) between side walls 52 of the pit 30, as shown for example in FIG. 3.

The curtain assembly 12 includes an upper curtain section 54 (e.g., a first section) and a lower curtain section 56 (e.g., a second section). The lower curtain section 56 is removably coupled to (e.g., can separate from) the upper curtain section 54. The connectors 20 connect or couple upper curtain section 54 and the front end 40 of the deck 38. The upper curtain section 54 can be any suitably flexible or semi-rigid material (e.g., a three-ply belting material).

Releasable coupling 22 provides a removable connection (e.g., a detachable, removable and/or restorable connection) between upper curtain section 54 and lower curtain section 56. The releasable coupling 22 facilitates assembly of the curtain assembly 12. For example, releasable coupling 22 enables installation of the curtain assembly (e.g., in two steps) by attaching upper curtain section 54 and deck 38 and attaching the lower curtain section 56 to the upper curtain section 54. In some examples, the lower curtain section 56 can be attached to the upper curtain section 54 and the upper curtain section 54 can be attached to deck 38.

Figure 6:
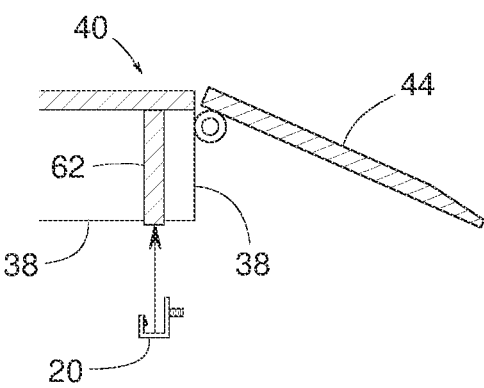
FIG. 6 is a partially exploded side view of the example front end of the example dock leveler and an example connector of FIGS. 1-5.
Figure 7:
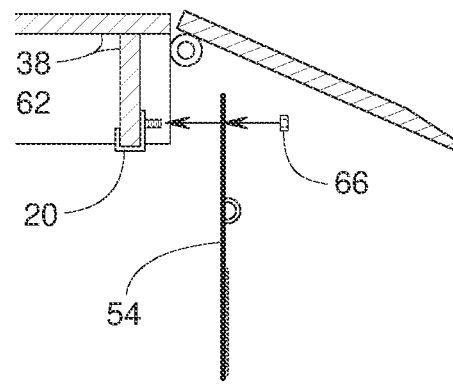
FIG. 7 is a partially exploded side view of an example upper curtain section and the example connector of FIG. 6.
Figure 8:
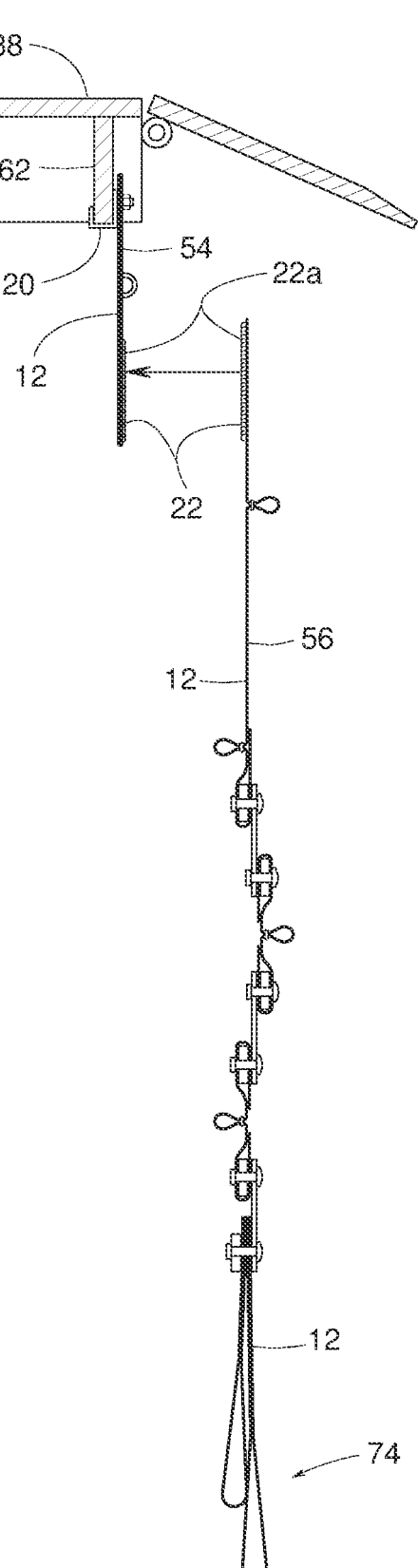
FIG. 8 is a partial exploded side view of an example lower curtain section and the example upper curtain section of FIG. 7.
Figure 9:
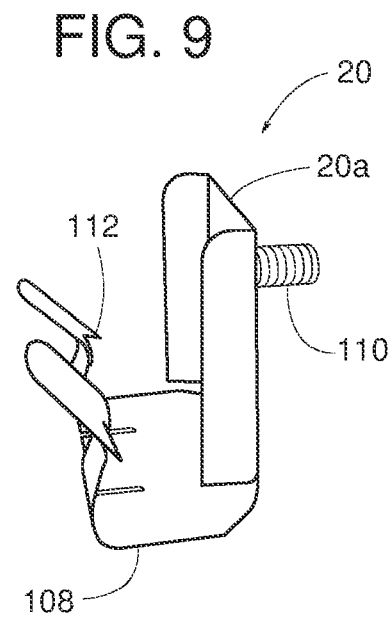
FIG. 9 is a perspective view of an example connector constructed in accordance with the teachings disclosed herein.
Figure 10:
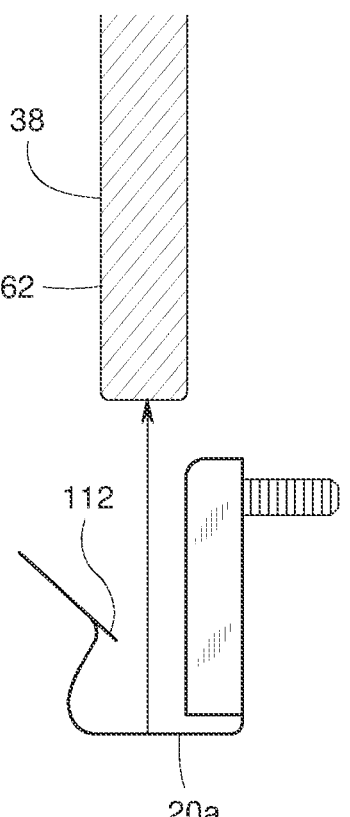
FIG. 10 is a partially exploded side view of an example dock leveler deck and the example connector of FIG. 9.
Figure 11:
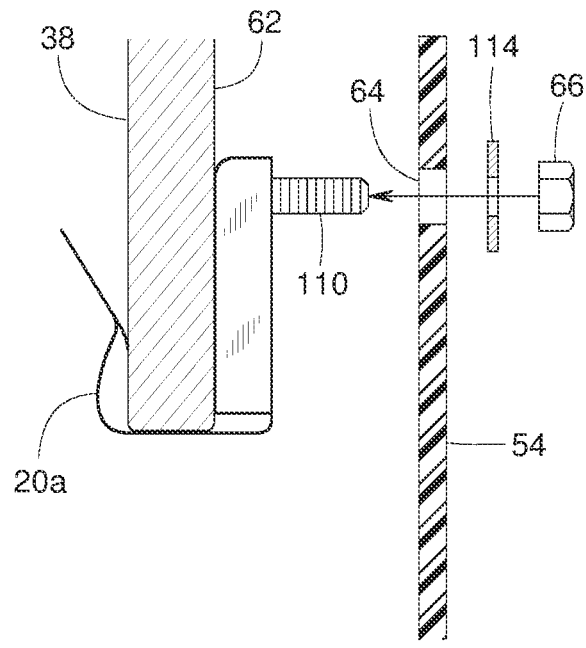
FIG. 11 is a partially exploded side view of the example upper curtain section of FIGS. 1-5, 7, and 8 and the example connector of FIGS. 9 and 10.

An example method for installing curtain assembly 12 is shown in FIGS. 6-8. The connectors 20 are attached to (e.g., the plate 39 of) the deck 38 at a mounting position as shown, for example, in FIG. 6. In some examples, the specific design or type of the connector 20 (e.g., see FIGS. 9-13) makes the connector 20 attachable to different mounting positions relative to the deck 38. Arrows 58 and 60 of FIG. 3, for example, represent mounting positions (e.g., that are infinitely variable) relative to deck 38. For instance, in some examples, the connectors 20 can be coupled (e.g., clamped or clipped) to a front plate 62 of deck 38 at almost any position along the width or height of front plate 62. For example, the front plate 62 is positioned underneath (e.g., and extends away from) an upper surface 37 of the deck 38. The front plate 62 of the illustrated example is non-parallel (e.g., perpendicular) relative to the upper surface 37 of the deck 38. Further details of connector 20 are described below.

Figure 3:
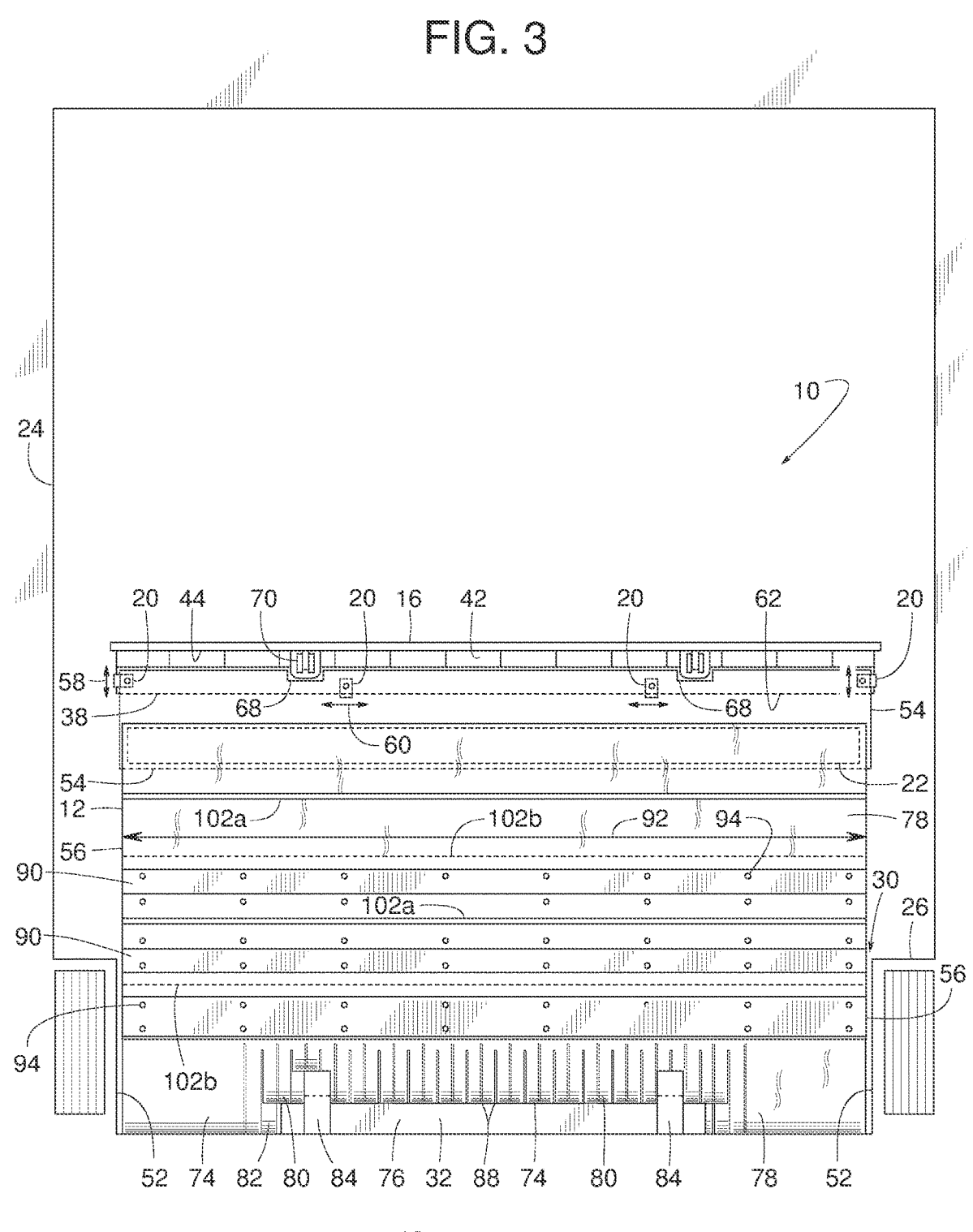
FIG. 3 is a front view of the example dock leveler apparatus shown in FIG. 1.

When the connectors 20 are attached to deck 38, holes 64 (FIGS. 11-13) corresponding to the positions of the connectors 20 are provided or formed (e.g., drilled) through upper curtain section 54. Upper curtain section 54 is placed onto the connectors 20 and held in place by fasteners 66 (e.g., nuts, screws, etc.), as shown for example in FIG. 7. Referring further to FIG. 3, cutouts 68 are formed in the upper curtain section 54 to enable the upper curtain section 54 to fit around different structures or various obstacles such as, for example, one or more actuator lugs 70 extending from the lip plate 44. The presence of such structures or obstacles can depend on a design of a particular dock leveler to which curtain assembly 12 is to be installed.

After the upper curtain section 54 is installed, the lower curtain section 56 is attached to the upper curtain section 54 via the releasable coupling 22, as shown for example in FIG. 8. In this example, the releasable coupling 22 is a touch-and-hold fastener 22a (e.g., a second fastener, hook-and-loop fastener, Velcro, etc.). The touch-and-hold fastener 22a allows a position of the lower curtain section 56 to be adjusted and accurately aligned relative to base frame 32 and/or the pit's side walls 52 before coupling the curtain sections 54 and 56 via touch-and-hold fastener 22a (e.g., prior to pressing together the curtain sections 54 and 56 at the touch-and-hold fastener).

With curtain assembly 12 attached to (e.g., and suspended from) the deck 38, the lower end 74 of the lower curtain section 56 sealingly rests upon (e.g., is not fixed or attached to) a lower portion 76 of the base frame 32 and remains detached therefrom (e.g., is not fastened or fixed to base frame 32 and/or the pit 30). In other words, the lower end 74 being detached from lower portion 76 of base frame 32 means that the lower end 74 can touch or engage (e.g., sealingly engage) the lower portion 76 of the base frame 32 but is not fastened or fixed (e.g., attached a fastener) to the lower portion 76.

In this example, certain sections of the curtain assembly 12 are made of a pliable sheet material 78 (e.g., vinyl, fabric, various combinations thereof, etc.), so curtain assembly 12 can readily fold and/or collapse as deck 38 descends from a raised position (FIGS. 1, 3 and 4) to a lowered position (FIGS. 2 and 5). The term, "pliable" refers to a sheet of material that can be crumpled or lightly folded over onto itself and subsequently unfolded without significant damage or permanent deformation of the sheet material.

In this example, a first plurality of looped flaps 80 and a second plurality of looped flaps 82 at the curtain assembly's lower end 74 are made of a pliable sheet material 78, so the looped flaps 80 and 82 are sufficiently flexible to sealingly conform to various irregularities or surface contours of the base frame's lower portion 76. An example of such irregularities or surface contours includes the lip keepers 84 on the base frame 32, as shown in FIG. 3. The lip keepers 84 support the weight of the deck 38 by providing a ledge upon which a tip 86 of the lip plate 44 rests when deck 38 is in a (e.g., horizontal) stored position.

The looped flaps 80 and 82 of the illustrated example are at different elevations. For example, the first looped flaps 80 are positioned in front of the second looped flaps 82 to enable the flaps 80 and 82 to seal against irregular surfaces. In the illustrated example, a plurality of slits 88 forming the flaps 80 and 82 are staggered laterally so that the flaps 80 and 82 overlap to cover each other's slits 88, as shown for example in FIG. 3.

While some sections of the curtain assembly 12 are made of the pliable material 78, other sections are relatively rigid. The rigid portions (e.g., stays) of the curtain assembly 12 support the curtain assembly 12 from wind and restrict or prevent the curtain assembly 12 from billowing in response to a pressure differential between the area 14 underneath the deck 38 and the outdoor air in front of the curtain assembly 12. For instance, some examples of the curtain assembly 12 include panels 90 that are stiffer than the pliable material 78. Some example panel materials include HMW (high molecular weight polyethylene) and/or fiberglass. In some examples, each panel 90 is about 0.125 inches by 3 inches and extends approximately a full width 92 of the curtain assembly 12.

In the illustrated example, the fasteners 94 (e.g., rivets, screws, etc.) connect the panels 90 to the curtain assembly's pliable sheet material 78, while a reinforcement bar 96 prevents or restricts a head 98 of the fastener 94 from tearing through sheet material 78, as fastener 94 clamps sheet material 78 between the panel 90 and the bar 96. In some examples, each reinforcement bar 96 can be about 0.250 inches by 1 inch, extends approximately the full width 92 of the curtain assembly 12, and is made of a material comparable to that of the panel 90. For strength, appearance, and/or ease of assembly, some examples of the curtain assembly 12 have the sheet material 78 wrapped around the bar 96, as shown for example in FIGS. 4 and 5.

To encourage the curtain assembly 12 to fold in a desired (e.g., predictable) manner so as not to interfere with the actuator 50 or other parts of the dock leveler 16, the curtain assembly 12 includes threaded seams 100 (e.g., strategically placed) to create a corresponding plurality of looped hems 102 (e.g., a first plurality of looped hems 102a and a second plurality of looped hems 102b) that urge curtain assembly 12 to fold in a predetermined or desired pattern. The looped hems 102 are an integral part of the pliable material 78.

In the example shown in FIGS. 4 and 5, the first plurality of looped hems 102a are on a front side 104 of the lower curtain section 56, and the second plurality of looped hems 102b are on a back side 106 of the curtain section 56. The front side 104 faces forward toward the vehicle 28, and the back side 106 faces back toward the area 14 underneath the deck 38. Also, the panels 90 are interposed between the looped hems 102. With such an arrangement of the looped hems 102 and the relatively stiff panels 90, the curtain assembly 12 can collapse from a pendant configuration (FIG. 4) to a generally (e.g., predetermined or predefined) folded configuration (FIG. 5) as deck 38 descends (e.g., toward the stored position). FIGS. 4 and 5 show that curtain assembly 12 is (e.g., vertically) longer in the pendant configuration than in the folded configuration.

Returning to the description of the connector 20, FIGS. 9-13 show details of various example connectors 20 (e.g., connectors 20a, 20b, and 20c). In the example shown in FIGS. 9-11, a connector 20a is a clip 108 (e.g., a resilient spring steel clip) having a screw 110 (e.g., a second fastener, a threaded screw formed with or attached to the clip 108) and a barb 112 (e.g., a first fastener, an integral barb). The clip 108 and the barb 112 provide a clamping force (e.g., a biting press fit) that can securely hold the connector 20a to the front plate 62 (e.g., a suitably thick front plate) of the deck 38. The screw 110 extends through the hole 64 in the upper curtain section 54, and the fastener 66 couples to the screw 110 to couple upper curtain section 54 to the connector 20 (e.g., hold the upper curtain section 54 in place). A washer 114 can be used to reinforce the upper curtain section 54 in the area around the hole 64.

Figure 12:
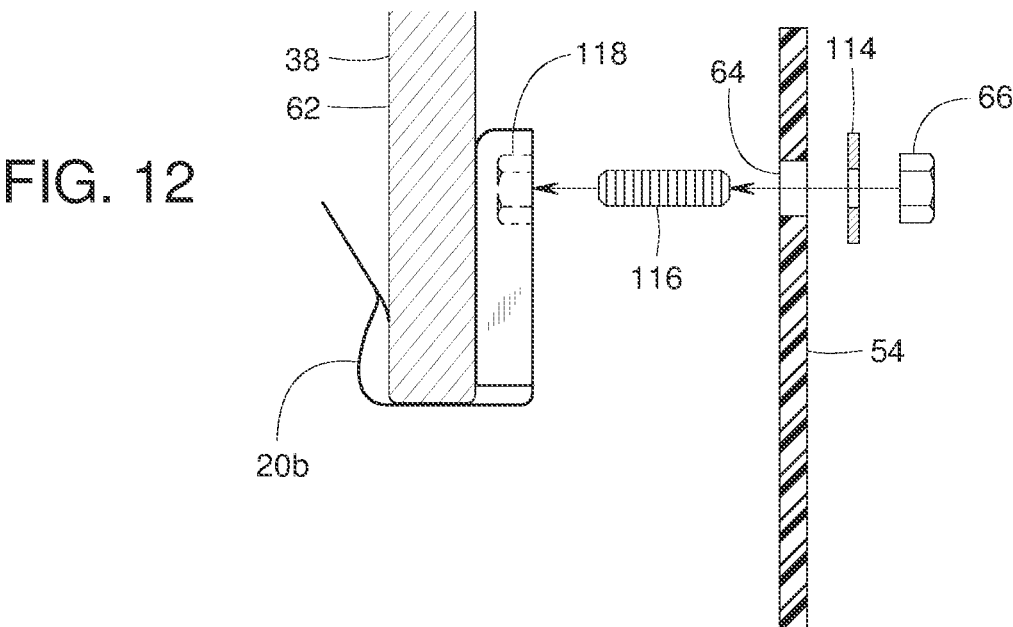
FIG. 12 is a partially exploded side view similar to FIG. 11 but showing another example connector disclosed herein.

Referring to FIG. 12, the connector 20b is a Tinnerman nut that clips or attaches onto the deck's front plate 62 in a manner similar to that of the connector 20a. A hollow hex head setscrew 116 with a cup point screws into a nut 118 of the connector 20b. The fastener 66 (e.g., a nut) and the washer 114 fasten the upper curtain section 54 to the connector 20b.

Figure 13:
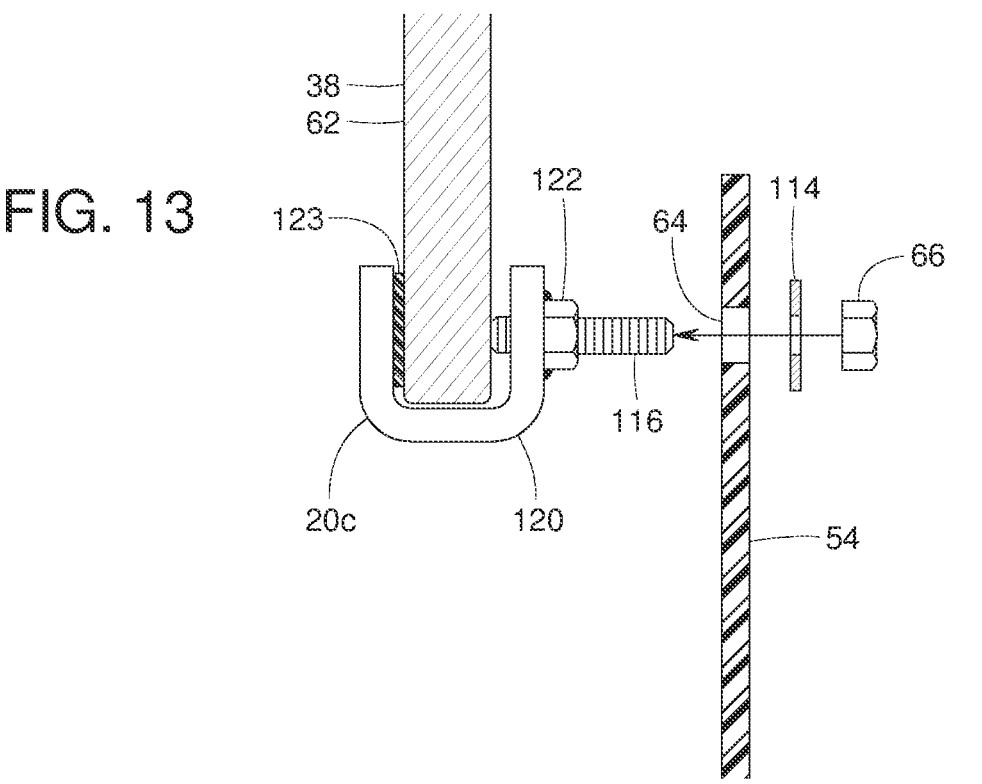
FIG. 13 is a side view similar to FIGS. 11 and 12 but showing yet another example connector disclosed herein.

In yet another example, shown in FIG. 13, a connector 20c includes a channel 120 (e.g., a short rigid channel), an integral nut 122, and a rubber pad 123 (e.g., a high-friction rubber pad). A setscrew 116 screws into the nut 122 (e.g., to engage the front plate 62) such that the connector 20c functions as a clamp (e.g., a C-clamp) that can securely clamp onto and grip the deck's front plate 64. The fastener 66 (e.g., a nut) and the washer 114 fasten the upper curtain section 54 to the connector 20c.

Figure 14:
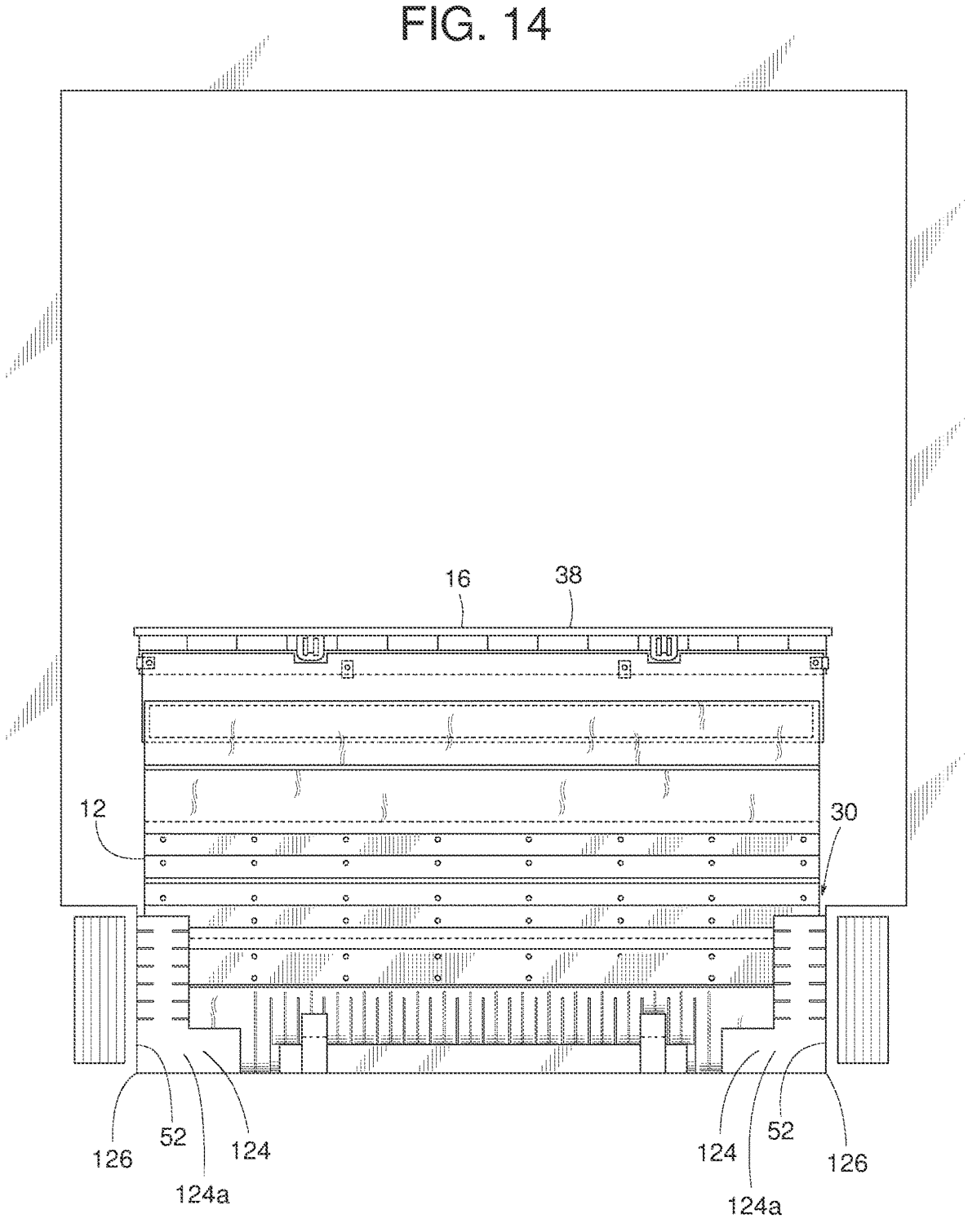
FIG. 14 is a front view of another example dock leveler apparatus having example corner seals disclosed herein.
Figure 15:
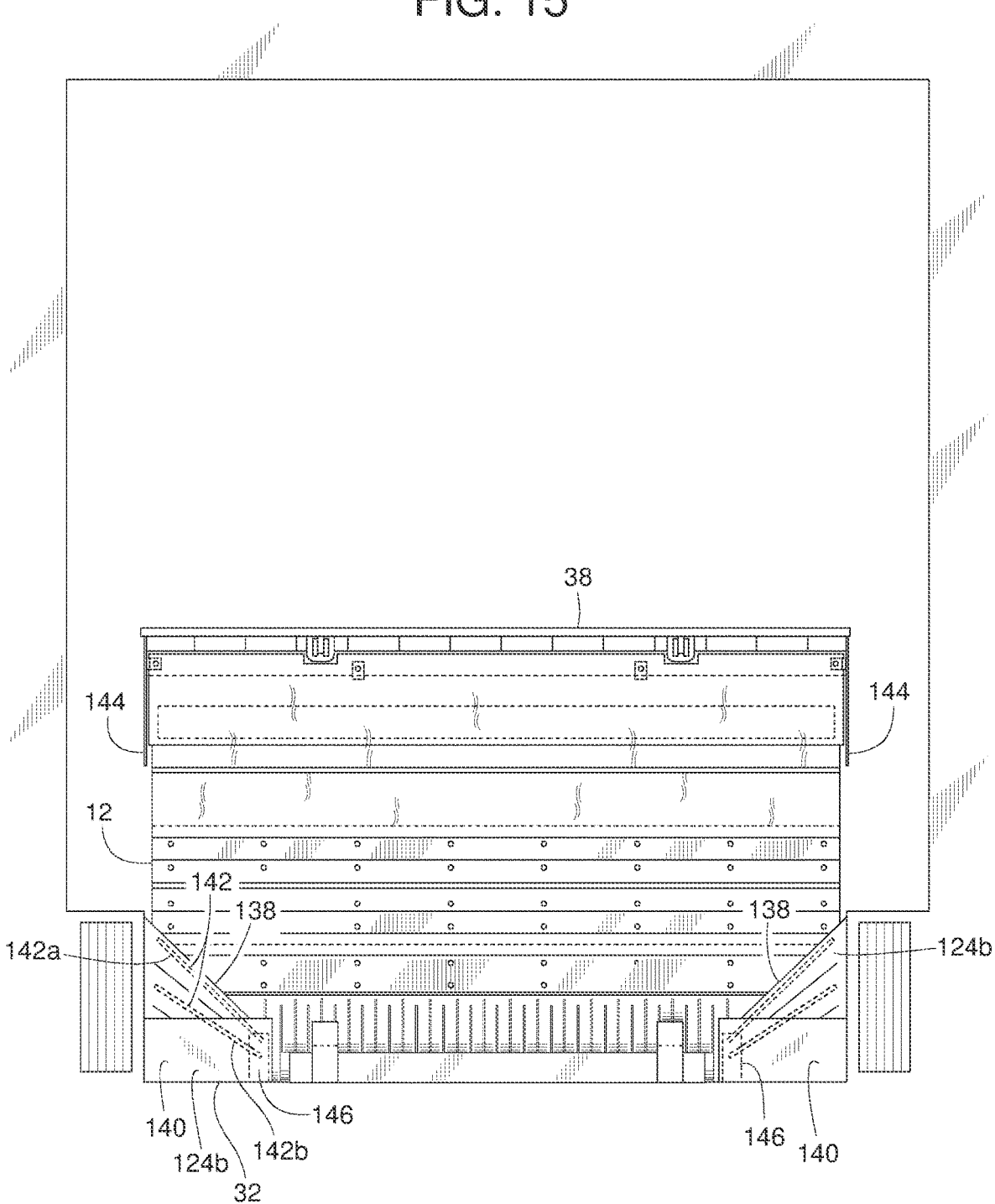
FIG. 15 is a front view of an example corner seal disclosed herein, where the example corner seal is in an example uncompressed position.
Figure 16:
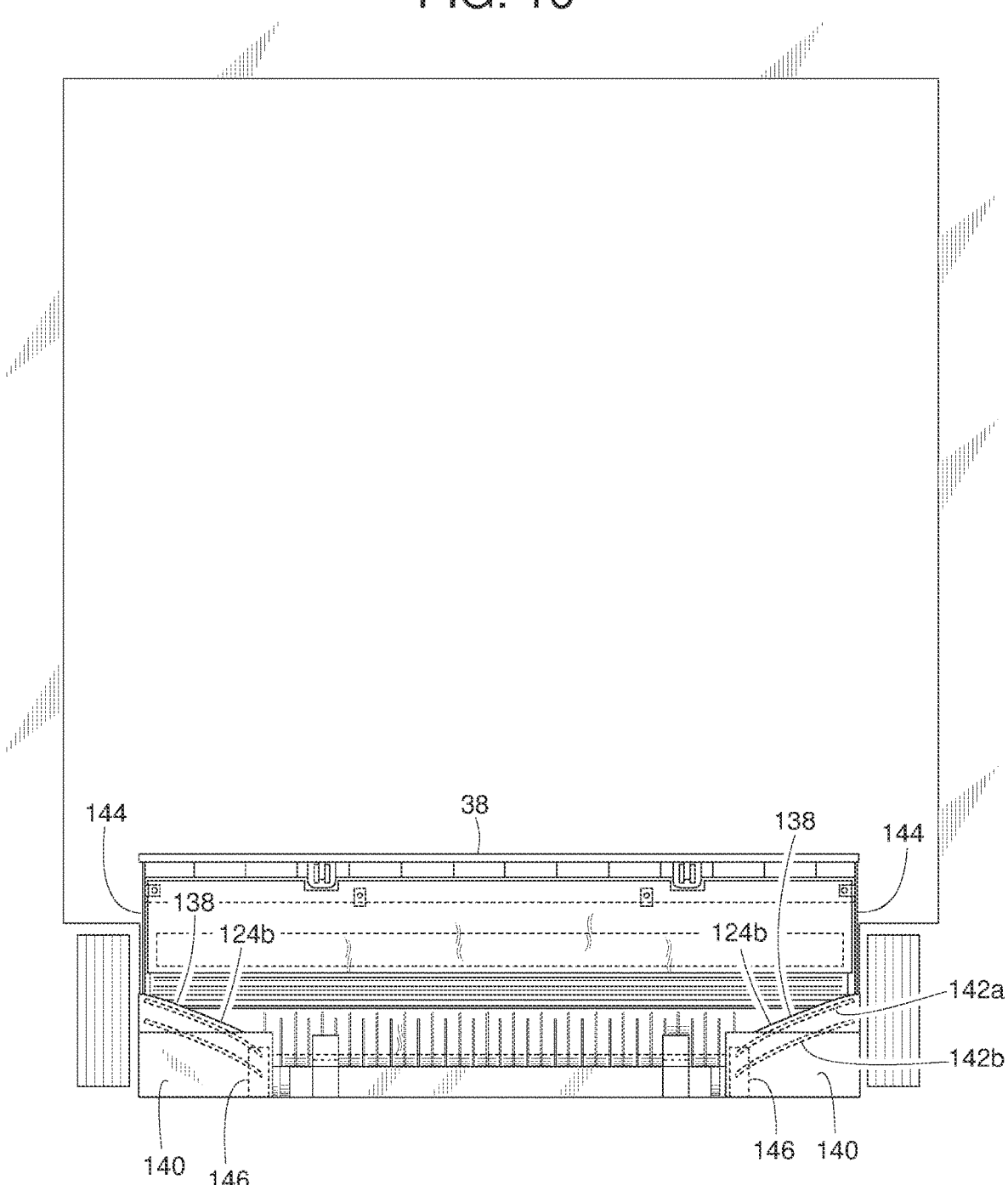
FIG. 16 is a front view of the corner seal shown in FIG. 15 but showing the example corner seal in an example compressed position.

Referring to FIGS. 14-16, a pair of corner seals 124 (e.g., corner seals 124a and 124b) are installed in front of the curtain assembly 12. The corner seals 124 seal gaps that might otherwise exist along the pit's side walls 52 and/or at lower front corners 126 of pit 30. The corner seals 124 can be of any suitable shape and construction. The corner seal 124a of FIG. 14 can be a panel formed of a flexible or semi-rigid material.

In the example shown in FIGS. 15 and 16, the corner seal 124b includes a pliable triangular sheet 138 behind a less flexible front panel 140. Some examples of the front panel 140 are made of any suitably flexible or semi-rigid material (e.g., a three-ply belting material). The sheet 138, in some examples, is made of a ten-ounce vinyl fabric supported by one or more resilient fiberglass stays 142 (e.g., an upper stay 142a and a lower stay 142b). In the illustrated example, a metal bracket 146 connects the stays 142, the sheet 138, and the panel 140 to a suitable anchor point, such as the base frame 32.

The flexibility of the sheet 138 and the stays 142 allows the seal 124b to partially collapse in reaction to the deck 38 descending to a lower position, as shown for example in FIG. 16. As the deck 38 descends, toe guards 144 on the sides of the deck 38 push the sheet 138 downwardly. In some examples, the upper stay 142a flexes until the upper stay 142a reaches the lower stay 142b. At this point, both the stays 142a and 142b flex until the deck 38 reaches a lowered position (e.g., a bottom most position). When the deck 38 rises toward the raised position, the stays 142 push the sheet 138 back up to a normally uncompressed position, as shown for example in FIG. 15.

Figure 17:
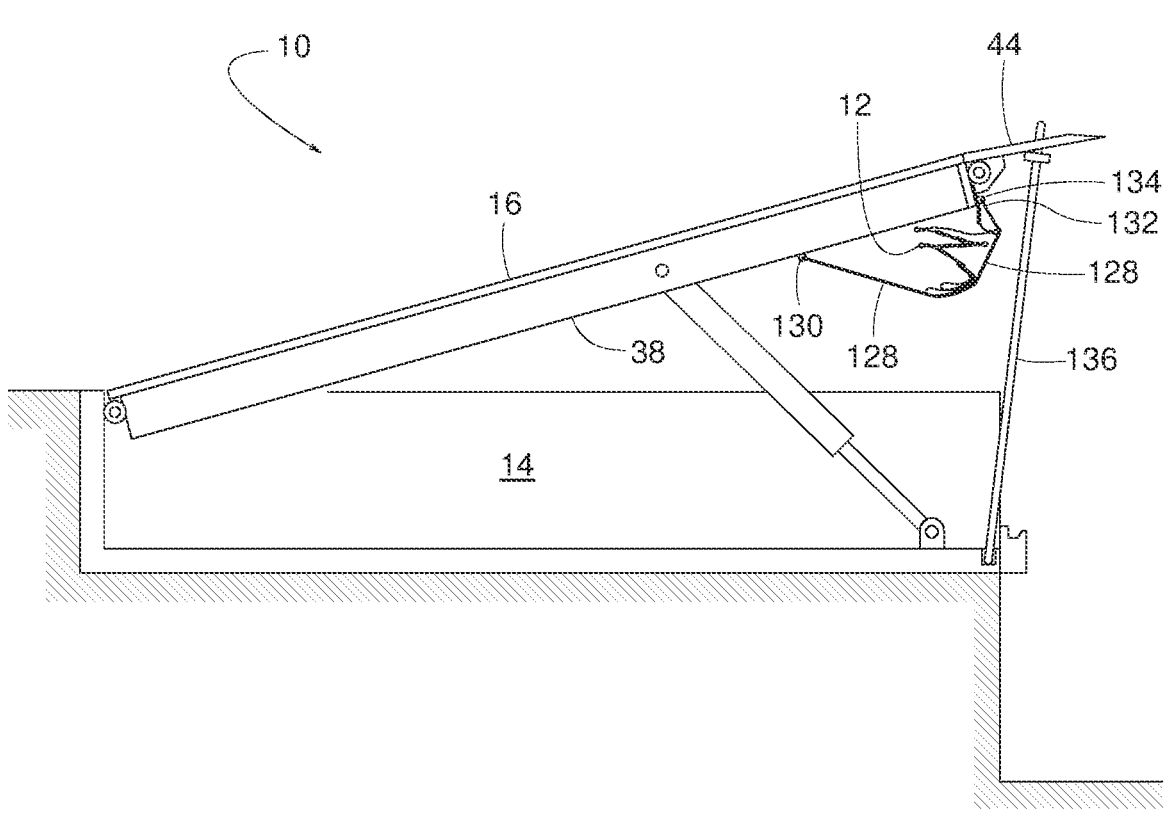
FIG. 17 is a side view similar to FIG. 1 but showing an example elastic tensioner disclosed herein.

In some examples, as shown in FIGS. 1, 2, and 17, the dock leveler apparatus 10 includes an elongate elastic tensioner 128 (e.g., a tension spring, an elastic strap, a bungee cord, etc.). The tensioner 128 can provide multiple functions. For example, the tensioner 128 prevents a positive indoor air pressure from blowing the curtain assembly 12 so far forward that the curtain assembly 12 fails to fold in the predetermined pattern (e.g., as intended). In some examples, as shown in FIGS. 1 and 2, the tensioner 128 has a first end 130 connected to the deck 38 and a second end 132 attached to the back side 106 of the lower curtain section 56.

In some examples, the tensioner 128 can hold the curtain assembly 12 in a compressed, folded shape, as shown for example in FIG. 17, to provide workers open access to the area 14 underneath the deck 38 during maintenance, inspection, cleaning and/or when repairing the deck 38. To change the dock leveler apparatus 10 from a normal operating configuration (FIGS. 1-5 and 14) to a service configuration (FIG. 17), the tensioner's second end 132 is disconnected from the back side 106 of the lower curtain section 56 and coupled to an anchor point 134 in front of the curtain assembly 12. In some examples, a temporary prop 136 is used for ensuring safe access to the underside of the deck 38 and the lip plate 44.

Figure 18:
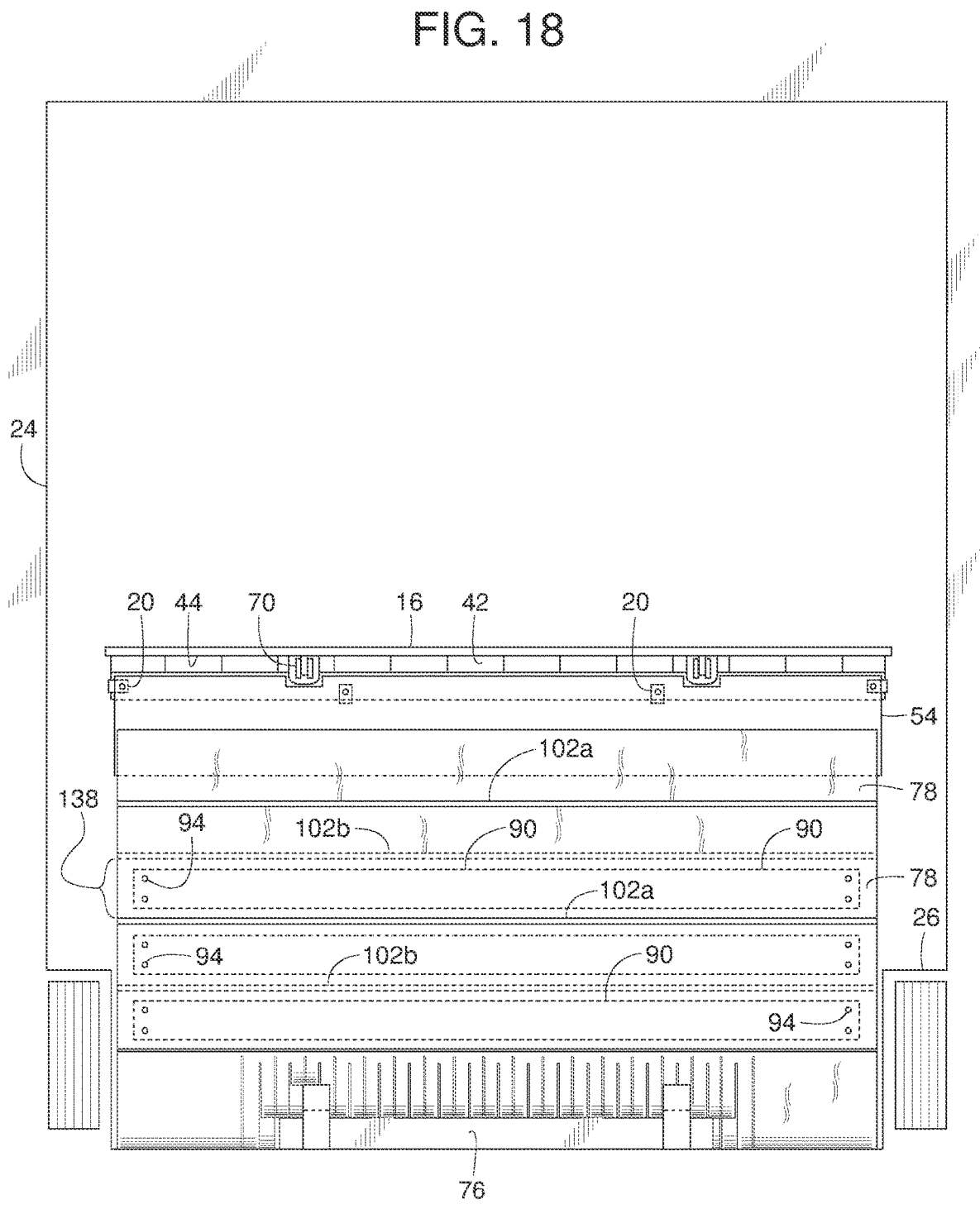
FIG. 18 is a front view similar to FIG. 3 but showing another example dock leveler disclosed herein.
Figure 19:
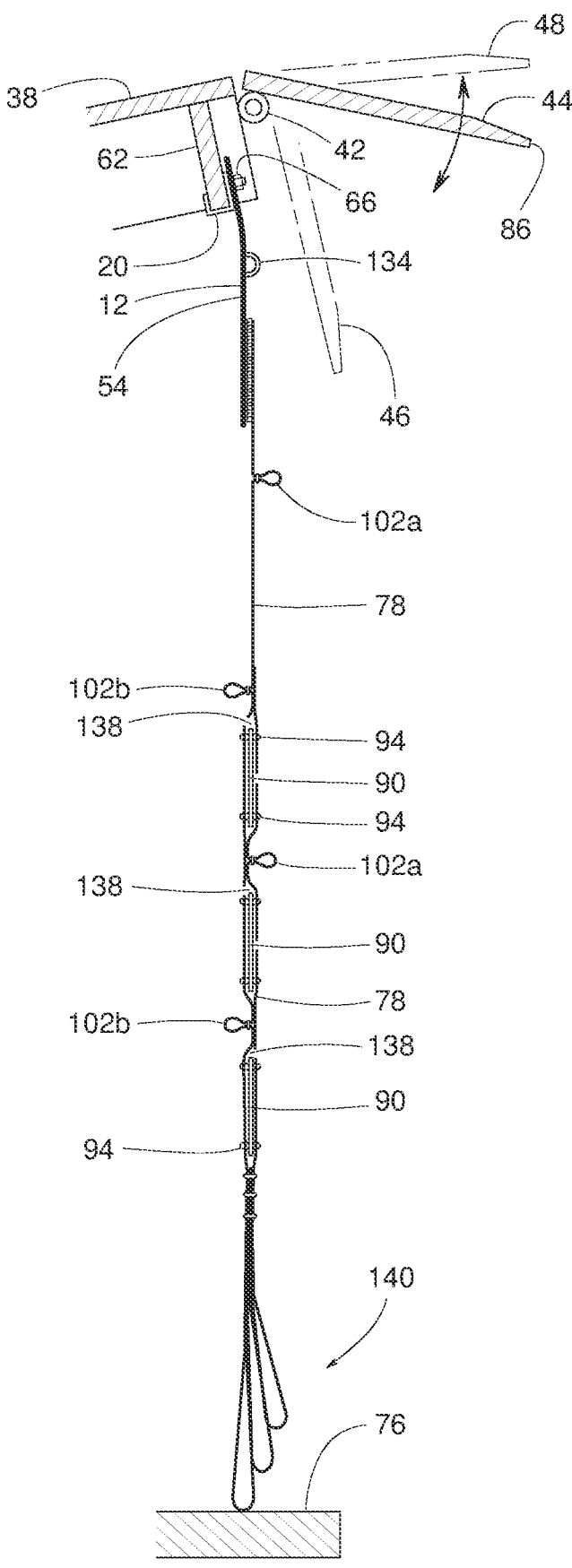
FIG. 19 is a side view similar to FIG. 4 but showing the example dock leveler apparatus of FIG. 18.

In another example, shown in FIGS. 18 and 19, pliable sheet material 78 is sewn such that it provides pockets 139 in which panels 90 are contained. This simplifies manufacturing, reduces the number of sewn seams, provides a neater appearance, and/or eliminates the need for reinforcement bars 96. In some examples, fasteners 94 hold panels 90 (e.g., securely) within pockets 139. In some examples, a plurality of looped flaps 141 sealingly conform to various irregularities of the base frame's lower portion 76. Flaps 141 are similar to flaps 80 and 82 but are of a different quantity and configuration to enhance sealing in some example installations.

Figure 20:
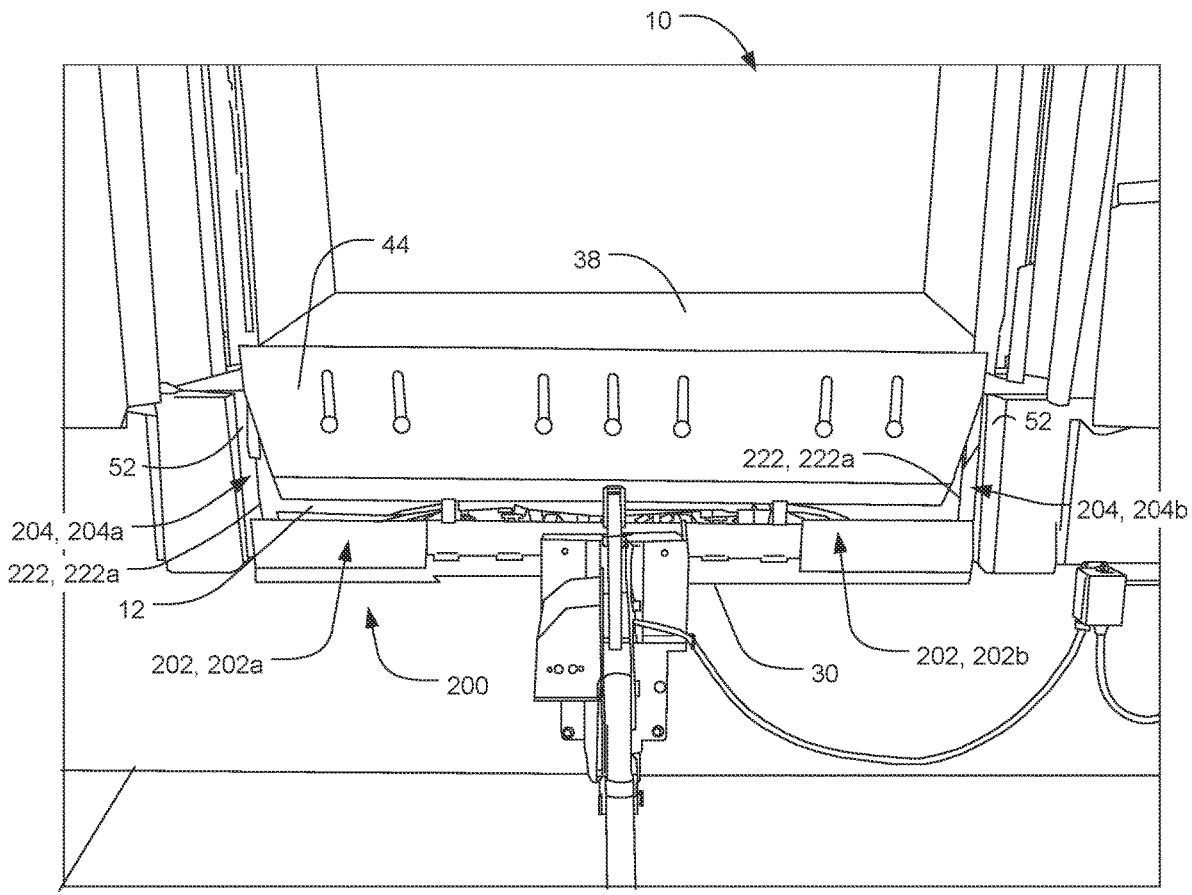
FIG. 20 is a front view of another example dock leveler apparatus having an example sealing assembly disclosed herein.

Referring to FIGS. 20-24, the dock leveler apparatus 10 of the illustrated example includes an example seal assembly 200 disclosed herein. The dock leveler apparatus 10 of FIG. 20 is shown with the deck 38 in a lowered position 201 (e.g., a use position) and the lip plate 44 in the retracted stored position 46 in front of the curtain assembly 12 (e.g., the upper curtain section 54 and/or the lower curtain section 56). The dock leveler apparatus 10 of the illustrated example includes a pair of corner seals 202 (e.g., corner seals 202a and 202b) and a pair of side wall seals 204 (e.g., side wall seals 204 and 204b). The corner seals 202 are installed in front of the curtain assembly 12. The corner seals 202 seal one or more gaps that may otherwise exist along the side walls 52 of the pit 30 and/or a front edge 208 of the pit 30. The side wall seals 204 are positioned longitudinally along the vertical height of the pit wall adjacent to and generally parallel to the edge of the curtain assembly 12 to seal the gap therebetween. Thus, the corner seals 202 and/or the side wall seals 204 improve sealing characteristics of the curtain assembly 12 without impeding operation of the leveler 16.

Figure 21:
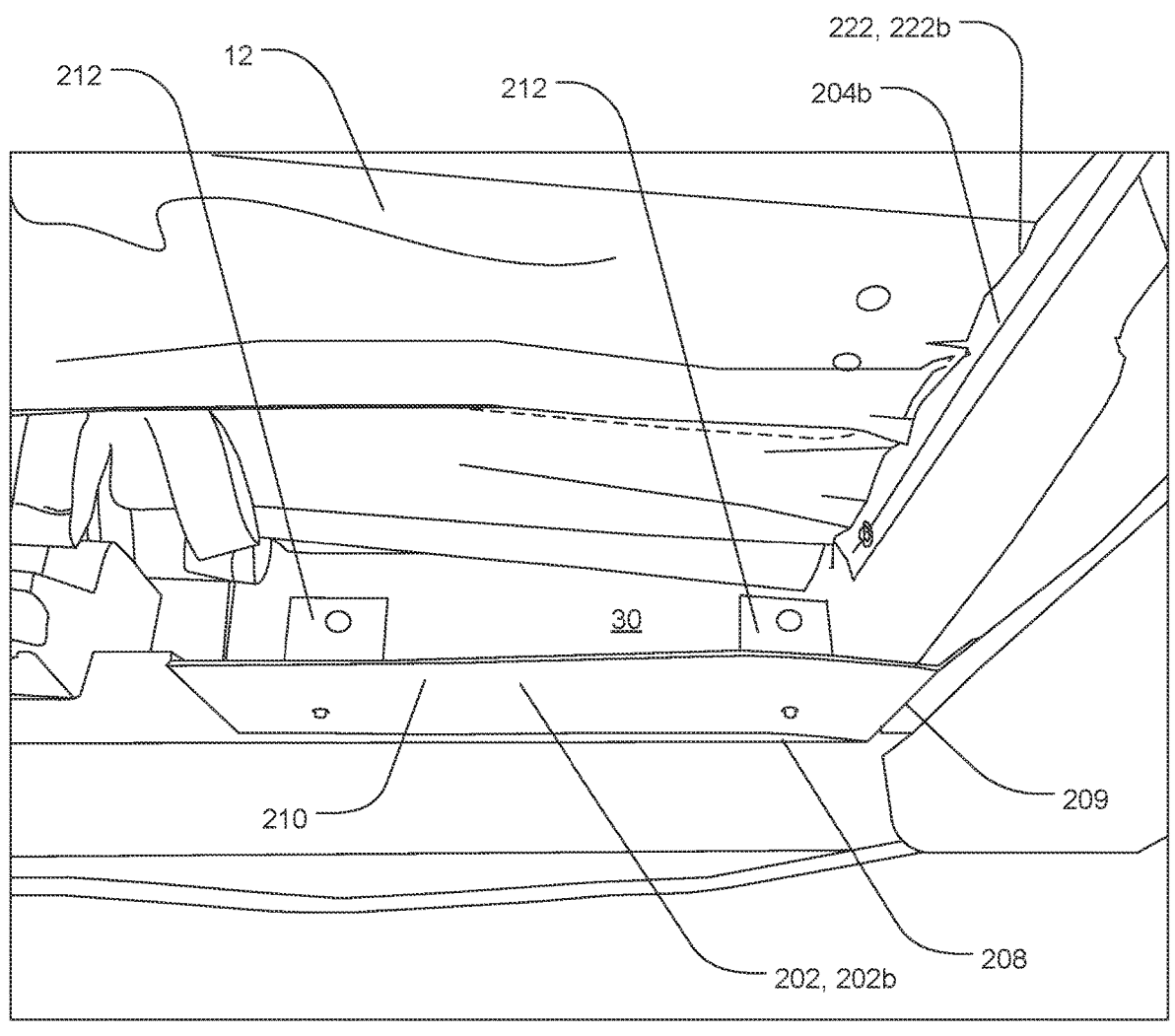
FIG. 21 is a perspective, top partial view of the dock leveler apparatus of FIG. 20.
Figure 22:
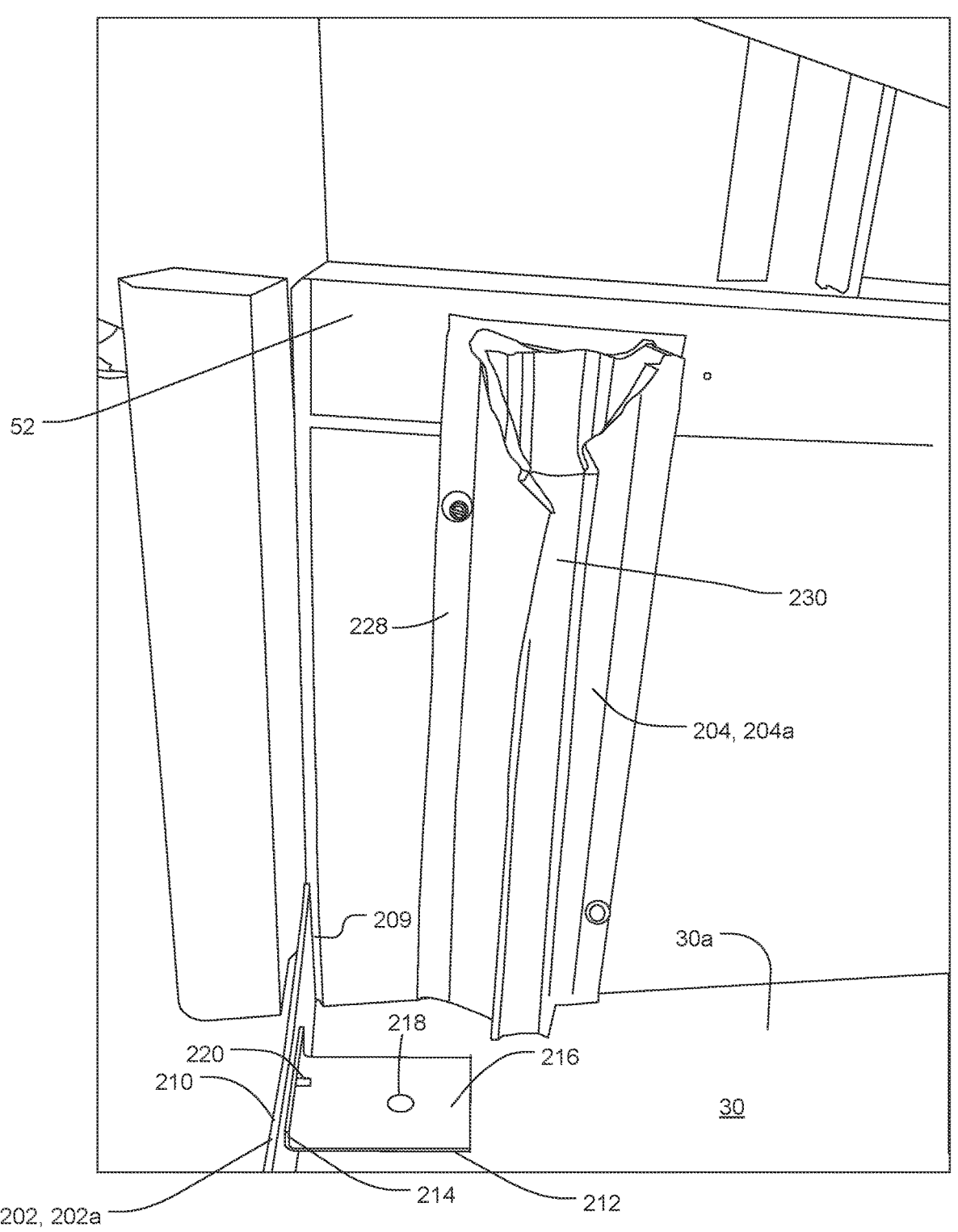
FIG. 22 is perspective side view of the example dock leveler apparatus of FIGS. 20-21.

Referring to FIGS. 21 and 22, the corner seals 202 each include a panel 210 and a bracket 212. The panel 210 can be formed of a flexible, semi-rigid material and/or rigid material. The panel 210 of the illustrated example has a rectangular shape and extends upward from a pit floor 30a or front edge 208 of the pit 30. However, in some examples, the panel 210 can have a square shape a contoured shape and/or any other shape. In some examples, an outer edge 209 of the panel 210 of the illustrated example engages (e.g., sealingly engages) a respective one of the side walls 52 of the pit 30. In some examples, one or more perimeter edges of the panel 210 can include a seal or strip of material (e.g., a rubber or pliable strip of material).

The bracket 212 of the illustrated example couples the panel 210 to the pit 30. Referring to FIG. 22, each bracket 212 (e.g., an L-shaped bracket) of the illustrated example includes a first portion 214 (e.g., a first leg) and a second portion 216 (e.g., a second leg) that extends from the first portion 214 toward the curtain assembly 12. The example bracket 212 includes one or more apertures 218 to receive fasteners for attaching the bracket 212 to the pit floor 30a. The first portion 214 attaches to the panel 210 via a fastener 220 and the second portion 216 attaches the panel 210 to the pit 30 via one or more fasteners (e.g., a magnet).

Figure 23:
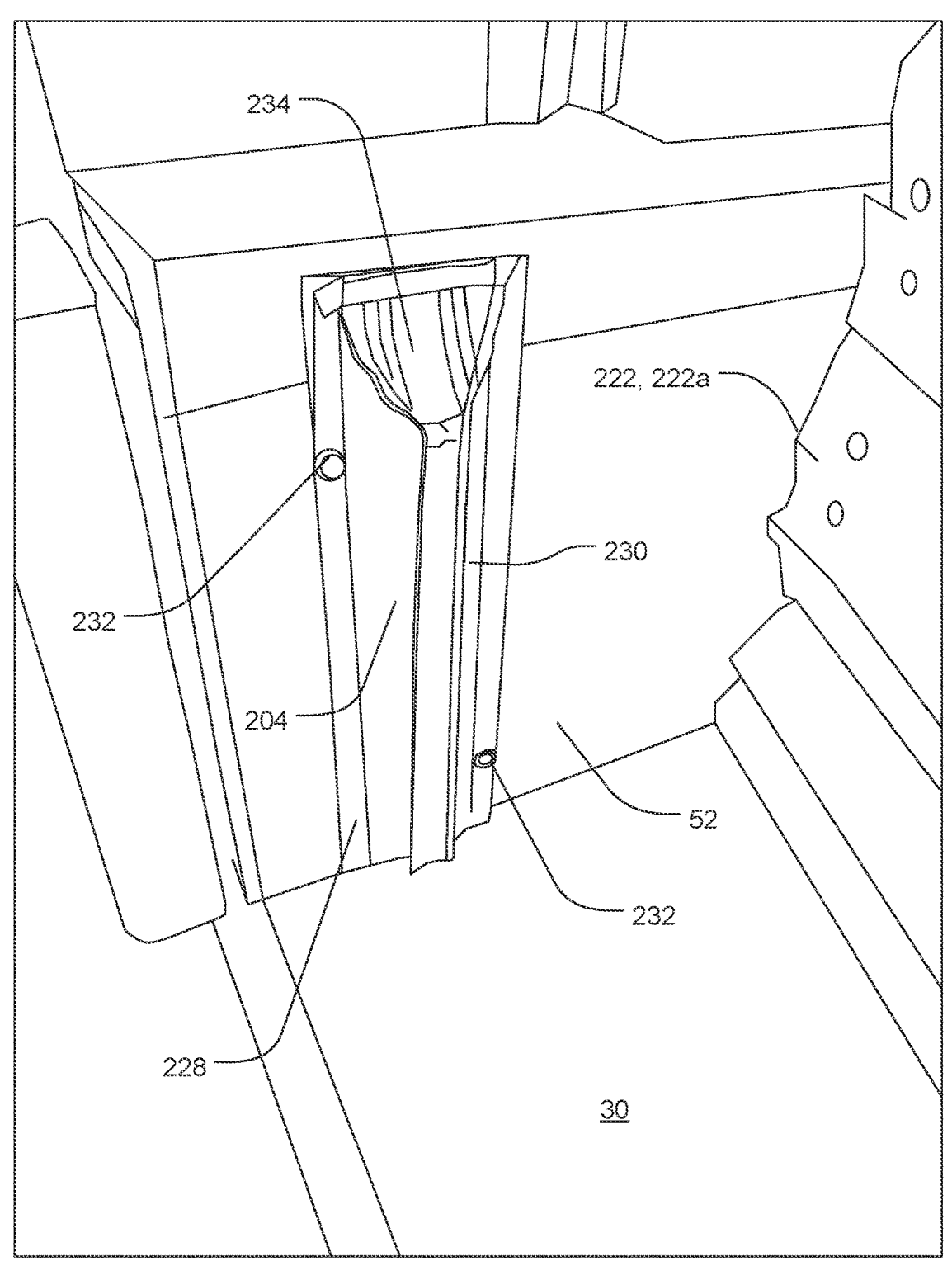
FIG. 23 is a side view of the example dock leveler apparatus of FIGS. 20-22.

Referring to FIGS. 22 and 23, to seal between respective lateral edges 222 of the curtain and the side walls 52 of the pit 30, the dock leveler apparatus 10 of the illustrated example incudes the side wall seals 204. The curtain assembly 12 is removed from FIG. 22 and the curtain assembly 12 is moved away from the side wall seal 204 in FIG. 23 for clarity. The first side wall seal 204a is positioned adjacent the first lateral edge 222a of the curtain assembly 12 and the second side wall seal 204b is positioned adjacent the second lateral edge 222b of the curtain assembly 12. The side wall seals 204 of the illustrated example are coupled to the side walls 52 of the pit 30. Thus, the side wall seals 204 reduce or eliminate a gap between the side walls 52 and respective ones of the lateral edges 222 of the curtain assembly 12 or intervening structure of the leveler 16, depending on the structure and position of the leveler 16. When the leveler 16 is in a stored or lowered position, a toe guard (e.g., the toe guard 144 FIGS. 15 and 16) attached to and extending downward from the lateral edge of the leveler deck 38 separates the side wall seal 204 from the lateral edge 222 of the curtain assembly 12. In other words, when the leveler 16 is in a stored position, the side wall seal 204 extends (seals) between the side wall 52 of the pit 30 and the toe guard (e.g., the toe guard 144) along a vertical depth dimension of the pit 30. In the absence of a toe guard, or when the leveler 16 is in a raised position, the side wall seal 204 extends (seals) between the side wall 52 of the pit 30 and the lateral edge 222 of the curtain assembly 12.

Figure 24:
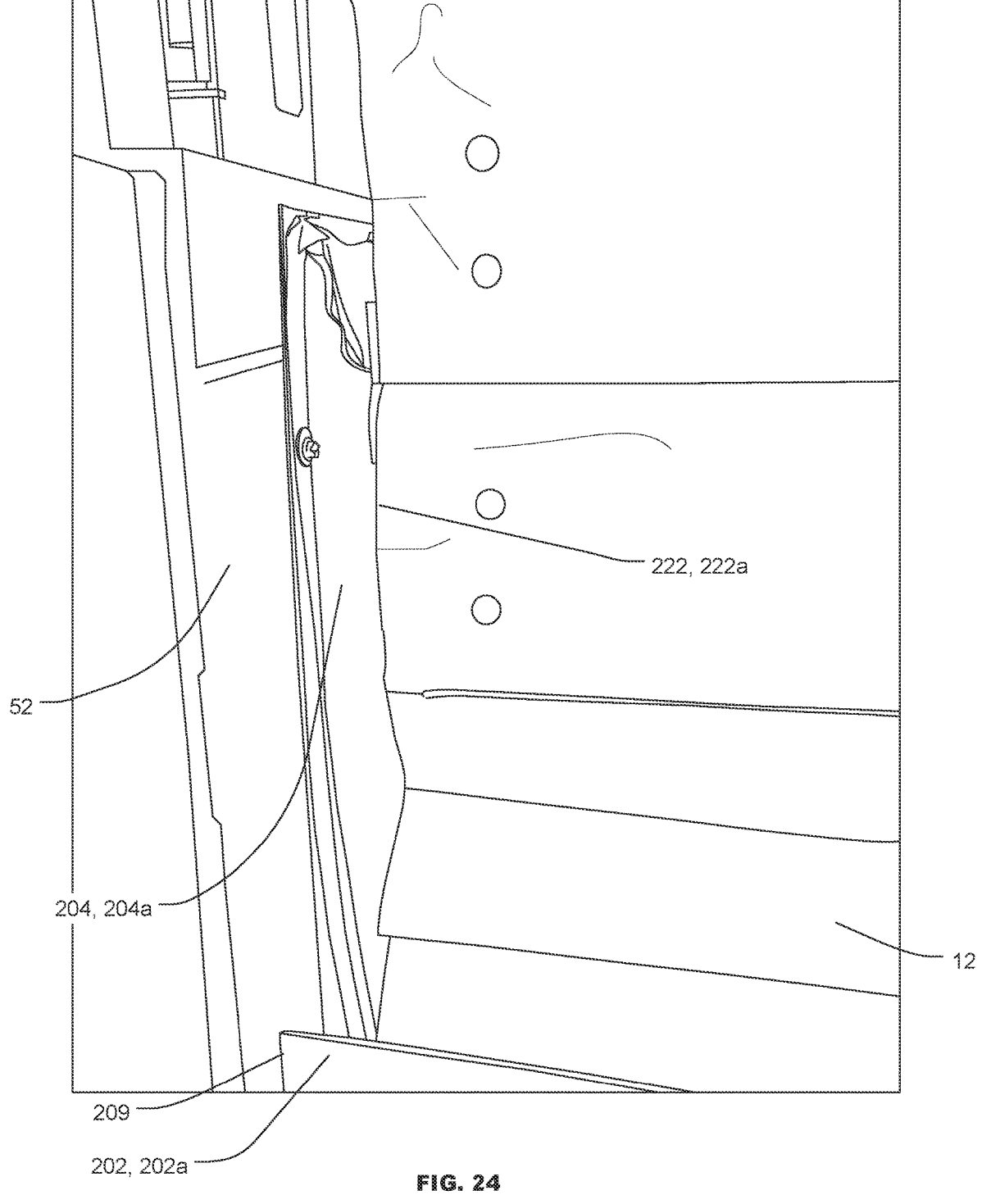
FIG. 24 is a perspective, partial front view of the dock leveler apparatus of FIGS. 20-23.

The side wall seals 204 each include a base 228 and a seal 230 that extends or protrudes from the base 228 in a direction away from the side wall 52 to which it is attached. The base 228 can be a rigid or semi-rigid material and the seal 230 can be a flexible and/or compressible material. The base 228 includes apertures to receive fasteners 232 that attach the side wall seals 204 to the side walls 52. The seal 230 defines a pocket or opening 234 to receive the lateral edge 222 of the curtain assembly 12. Referring to FIG. 24, in operation, when the deck 38 is in the raised position (e.g., as shown in FIG. 1), the curtain assembly 12 engages the side wall seals 204 to provide a seal between the respective lateral edges 222 (e.g., of the upper curtain section 54 and/or the lower curtain section 56) of the curtain assembly 12 and the side walls 52 of the pit 30. The side wall seals 204 engage (e.g., enclose or wrap around) a front surface and/or a rear surface of the lateral edges 222 of the curtain assembly 12. The corner seals 202 provide a seal at the lower corners and lower edge of the curtain assembly 12.

It should be understood that it is not necessary for a particular feature of one example disclosed herein is to be used exclusively with that example. Instead, any of the features of the example dock leveler apparatus described above and/or depicted in the drawings can be combined or implemented with any of the other example dock leveler apparatus disclosed herein, in addition to or in substitution for any of the other features of those examples. One example's features are not mutually exclusive to another example's features. Instead, the scope of this disclosure encompasses any combination of any of the features.

At least some of the aforementioned examples include one or more features and/or benefits including, but not limited to, the following:

In some examples, a curtain assembly that includes an upper curtain section and a lower curtain section. The curtain assembly is movable between a folded configuration and a pendant configuration. The curtain assembly having a longer length in the pendant configuration than in the folded configuration. A connector couples to the upper curtain section to a deck pivotally coupled to a base frame of a dock leveler. A releasable coupling between the upper curtain section and the lower curtain section is to removably couple the lower curtain section and the upper curtain section.

In some examples, the releasable coupling is a touch-and-hold fastener.

In some examples, the connector is structured to mount to the deck at a position between a first side edge and a second side edge of the deck.

In some examples, a barb extends from the connector to engage the deck, and the connector is resiliently flexible.

In some examples, the connector engages the deck without extending therethrough, and wherein the connector is resiliently flexible In some examples, the connector is a clamp.

In some examples, a lower end of the lower curtain section includes a first plurality of looped flaps made of a pliable sheet material.

In some examples, the lower end of the lower curtain section includes a second plurality of looped flaps with the first plurality of looped flaps on a front side of the lower curtain section, and the second plurality of looped flaps on a back side of the lower curtain section.

In some examples, an elastic tensioner having a first end to be connected to the deck and a second end attached to a back side of the lower curtain section.

In some examples, the dock leveler apparatus is configurable between a normal operating configuration and a service configuration, the dock leveler apparatus including an elastic tensioner having a first end to be connected to the deck, the elastic tensioner having a second end structured to attach to a back side of the lower curtain section when the dock leveler apparatus is in the normal operating configuration and attach to a front side of the curtain assembly when the dock leveler apparatus is in the service configuration.

In some examples, a first plurality of looped hems is on a front side of the lower curtain section.

In some examples, a second plurality of looped hems is on a back side of the lower curtain section.

In some examples, a first plurality of looped hems and a second plurality of looped hems urge the curtain assembly to the folded configuration.

In some examples, the first plurality of looped hems and the second plurality of looped hems being part of a pliable sheet material.

In some examples, a plurality of panels interposed between a first plurality of looped hems and a second plurality of looped hems, where the plurality of panels is stiffer than the pliable sheet material.

In some examples, a plurality of panels interposed between the first plurality of looped hems and the second plurality of looped hems, where the plurality of panels is stiffer than the pliable sheet material In some examples, the apparatus includes a plurality of bars is stiffer than the pliable sheet material.

In some examples, a plurality of fasteners clamps the pliable sheet material between the plurality of panels and the plurality of bars.

In some examples, the pliable sheet material defines a plurality of pockets to contain the plurality of panels.

In some examples, the lower curtain section is detached from the base frame of the dock leveler.

In some examples, a dock leveler apparatus includes a curtain assembly including an upper curtain section and a lower curtain section. The curtain assembly is movable between a folded configuration and a pendant configuration. The curtain assembly is longer in the pendant configuration than in the folded configuration. A connector connects the upper curtain section to a deck pivotally coupled to a base frame of the dock leveler. The connector is structured to mount to a face plate of the deck. A touch-and-hold fastener to couple the lower curtain section and the upper curtain section In some examples, a barb extends from the connector to engage the deck.

In some examples, a lower end of the lower curtain section includes a first plurality of looped flaps.

In some examples, an elastic tensioner having a first end to couple to the deck and a second end to couple to a back side of the lower curtain section.

In some examples, the curtain assembly includes an upper curtain section, a lower curtain section, and one or more releasable fasteners connecting the upper curtain section and the lower curtain section In some examples, the connector couples the curtain assembly to the deck at a position extending between a first side edge and a second side edge of the deck.

In some examples, a barb extending from the connector to engage the deck, and wherein the connector is resiliently flexible.

In some examples, the connector is a clamp.

In some examples, a lower end of the curtain assembly includes a first plurality of looped flaps made of a pliable sheet material.

In some examples, the lower end of the curtain assembly includes a second plurality of looped flaps with the first plurality of looped flaps on a front side of the curtain assembly, and the second plurality of looped flaps on a back side of the curtain assembly.

In some examples, an elastic tensioner having a first end to be connected to the deck and a second end attached to a back side of the curtain assembly.

In some examples, the deck is configurable between a normal operating configuration and a service configuration, the dock leveler apparatus including an elastic tensioner having a first end to be connected to the deck, the elastic tensioner having a second end structured to attach to a back side of the curtain assembly when the dock leveler apparatus is in the normal operating configuration and extend to a front side of the curtain assembly when the dock leveler apparatus is in the service configuration.

In some examples, a first plurality of looped hems on a front side of the curtain assembly; and a second plurality of looped hems on a back side of the curtain assembly, the first plurality of looped hems and the second plurality of looped hems to urge the curtain assembly to the folded configuration, the first plurality of looped hems and the second plurality of looped hems being formed of a pliable sheet material.

In some examples, a plurality of panels interposed between the first plurality of looped hems and the second plurality of looped hems, the plurality of panels being stiffer than the pliable sheet material.

In some examples, a plurality of bars that are stiffer than the pliable sheet material, and a plurality of fasteners to clamp the pliable sheet material between the plurality of panels and the plurality of bars.

In some examples, the pliable sheet material defines a plurality of pockets to contain the plurality of panels.

In some examples, the lower edge of the curtain assembly is detached from a base frame of the dock leveler and the pit.

In some examples, a dock leveler includes a deck pivotally connected to a base frame mounted in a pit. A curtain assembly is configurable between a folded configuration and a pendant configuration. The curtain assembly including a first plurality of looped hems on a front side of the curtain assembly and a second plurality of looped hems on a back side of the curtain assembly. The first plurality of looped hems and the second plurality of looped hems to urge the curtain assembly to the folded configuration, the first plurality of looped hems and the second plurality of looped hems being formed of a pliable sheet material. A connector is to couple the curtain assembly to the deck.

In some examples, the curtain assembly includes an upper curtain section, a lower curtain section, and one or more releasable fasteners connecting the upper curtain section to the lower curtain section.

In some examples, the connector is resiliently flexible, a barb extends from the connector to engage the deck, and the connector has a mounting position that is infinitely variable relative to the deck/

In some examples, the connector is structured to mount to the deck such that the curtain assembly is positioned between a first side edge and a second side edge of the deck along a front edge of the leveler deck.

In some examples, the connector is a clamp.

In some examples, a lower end of the curtain assembly includes a first plurality of looped flaps made of a pliable sheet material.

In some examples, the lower end of the curtain assembly includes a second plurality of looped flaps with the first plurality of looped flaps on a front side of the curtain assembly, and the second plurality of looped flaps on a back side of the curtain assembly.

In some examples, an elastic tensioner having a first end to be connected to the deck and a second end attached to a back side of the curtain assembly.

In some examples, configurable between a normal operating configuration and a service configuration, the dock leveler apparatus including an elastic tensioner having a first end to be connected to the deck, the elastic tensioner having a second end structured to attach to a back side of the curtain assembly when the dock leveler apparatus is in the normal operating configuration and extend across a front side of the curtain assembly when the dock leveler apparatus is in the service configuration.

In some examples, a plurality of panels interposed between the first plurality of looped hems and the second plurality of looped hems, the plurality of panels being stiffer than the pliable sheet material.

In some examples, a plurality of bars that are stiffer than the pliable sheet material, and a plurality of fasteners to clamp the pliable sheet material between the plurality of panels and the plurality of bars.

In some examples, the pliable sheet material defines a plurality of pockets to contain the plurality of panels.

In some examples, the lower edge of the curtain assembly is detached from a base frame of the dock leveler and the pit.

In some examples, a side wall seal connected to and extending from a lateral side of the pit and toward a lateral edge of the curtain assembly.

In some examples, a corner seal removably coupled to extend from a floor or lateral side wall of the pit adjacent the front edge of the pit.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. A curtain assembly comprising:
a curtain movable between a folded configuration and a pendant configuration; and
a connector to couple the curtain to a deck of a dock leveler, the connector structured to mount to the deck at a position between a first side edge and a second side edge of the deck adjacent a front edge of the deck, the connector including a channel defined between a first portion of the connector and a second portion of the connector, the channel to receive a forward wall of the deck adjacent the front edge, the first portion of the connector is to engage a first surface of the forward wall and the second portion of the connector is to engage a second surface of the forward wall opposite the first surface when the channel receives the forward wall.

2. The curtain assembly of claim 1, wherein the connector is a clip that is press fit with the deck.

3. The curtain assembly of claim 2, wherein the clip is a body having a front wall and a rear wall defining a channel therebetween, the front wall having a fastener and the rear wall having a barb.

4. The curtain assembly of claim 3, wherein the fastener fastens an upper portion of the curtain and the connector.

5. The curtain assembly of claim 1, wherein the connector is a c-shaped clamp.

6. The curtain assembly of claim 1, wherein a lower edge of the curtain is to be free from connectors.

7. The curtain assembly of claim 1, wherein the first portion of the connector includes a fastener interface to couple an upper portion of the curtain and the connector, the first portion of the connector to be positioned between the curtain and a front plate of the deck when the curtain is coupled to the connector and the connector is coupled to the deck.

8. The curtain assembly of claim 7, further including a barb extending from the connector to engage the deck, and wherein the connector is resiliently flexible.

9. The curtain assembly of claim 1, wherein the curtain is to hang freely from the deck when the curtain is coupled to the deck via the connector.

10. A curtain assembly comprising:
a curtain movable between a folded configuration and a pendant configuration, the curtain assembly to extend between a deck of a dock leveler and a floor of a pit, a lower edge of the curtain assembly to depend freely from the deck, the lower edge to sealingly engage a surface; and
one or more connectors to fasten an upper edge of the curtain assembly along and adjacent to a front edge of the deck, wherein the one or more connectors engage the deck without extending therethrough, and wherein the one or more connectors are flexible.

11. The curtain assembly of claim 10, wherein the lower edge of the curtain assembly is not fastened to the surface or a base frame of the dock leveler or the pit to enable the lower edge to depend freely from the deck.

12. The curtain assembly of claim 10, further including a side wall seal connected to and extending from a lateral side of the pit and toward a lateral edge of the curtain assembly.

13. A curtain assembly comprising:
a curtain movable between a folded configuration and a pendant configuration, the curtain including a first plurality of looped flaps made of a pliable sheet material;
a connector to slidably couple to a deck of a dock leveler, the connector structured to mount to the deck at a position between a first side edge and a second side edge of the deck and adjacent a front edge of the deck; and
a fastener to couple the curtain and the connector, a lower edge of the curtain to depend freely from the deck when the curtain is coupled to the connector via the fastener.

14. The curtain assembly of claim 13, wherein the curtain is coupled to the deck using only the connector.

15. The curtain assembly of claim 13, wherein the connector is a clamp.

16. The curtain assembly of claim 13, wherein the lower edge of the curtain is to rest on a surface, the looped flaps to sealingly engage the surface.

17. The curtain assembly of claim 13, the connector includes a body having a first wall and a second wall defining a channel therebetween, the connector to couple to a front plate of the deck such that the channel receives at least a portion of the front plate, the first wall engages a first surface of the front plate, and the second wall engages a second surface of the front plate opposite the first surface.

18. The curtain assembly of claim 17, wherein the fastener includes a first fastener portion and a second fastener portion, the first wall including the first fastener portion, the second fastener portion to couple to the first fastener portion to couple the curtain and the connector.

19. The curtain assembly of claim 13, wherein the curtain assembly includes a first curtain portion including an upper edge and a second curtain portion including the lower edge, and further including a coupler to releasably couple the first curtain portion and the second curtain portion.

20. A curtain assembly comprising:
a curtain movable between a folded configuration and a pendant configuration; and
a plurality of clips to fasten an upper edge of the curtain assembly along a front edge of a deck of a dock leveler, the clips to be press fit with the deck, the clips to be spaced apart along the front edge between a first side edge and a second side edge of the deck, wherein the clips each include a body having a front wall and a rear wall defining a channel therebetween, the front wall having a fastener and the rear wall having a barb, the fastener to couple an upper portion of the curtain and the body.

* * * * *